United States Patent
Iida et al.

(10) Patent No.: US 9,257,863 B2
(45) Date of Patent: Feb. 9, 2016

(54) CHARGE AND DISCHARGE CONTROL DEVICE AND CHARGE AND DISCHARGE CONTROL METHOD

(71) Applicant: Panasonic Corporation, Osaka (JP)

(72) Inventors: Takashi Iida, Hyogo (JP); Kohji Matsumura, Hyogo (JP); Kazufumi Nishikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 175 days.

(21) Appl. No.: 14/119,472

(22) PCT Filed: Mar. 15, 2013

(86) PCT No.: PCT/JP2013/001801
§ 371 (c)(1),
(2) Date: Nov. 22, 2013

(87) PCT Pub. No.: WO2013/145618
PCT Pub. Date: Oct. 3, 2013

(65) Prior Publication Data
US 2014/0084872 A1  Mar. 27, 2014

(30) Foreign Application Priority Data

Mar. 26, 2012 (JP) ................. 2012-069795

(51) Int. Cl.
*H02J 7/00* (2006.01)
*H01M 10/44* (2006.01)
*H02J 7/35* (2006.01)

(52) U.S. Cl.
CPC ............. *H02J 7/007* (2013.01); *H01M 10/441* (2013.01); *H02J 7/35* (2013.01); *H01M 2220/10* (2013.01); *H02J 2007/0067* (2013.01)

(58) Field of Classification Search
CPC ........................................................ H02J 7/007
USPC ........................................................... 320/126
See application file for complete search history.

(56) References Cited

U.S. PATENT DOCUMENTS

| 6,608,396 B2 | 8/2003 | Downer et al. |
| 2003/0107352 A1 | 6/2003 | Downer et al. |
| 2013/0088201 A1 | 4/2013 | Iwasawa et al. |

FOREIGN PATENT DOCUMENTS

| JP | 57-116551 | 7/1982 |
| JP | 2003-209969 | 7/2003 |
| JP | 2008-42999 | 2/2008 |
| JP | 2009-213288 | 9/2009 |
| JP | 2012-095418 | 5/2012 |
| WO | 2011/132311 | 10/2011 |

OTHER PUBLICATIONS

International Search Report issued Jun. 18, 2013 in International (PCT) Application No. PCT/JP2013/001801.

*Primary Examiner* — Sun Lin
(74) *Attorney, Agent, or Firm* — Wenderoth, Lind & Ponack, L.L.P.

(57) ABSTRACT

A charge and discharge control device includes: a coordination unit which generates coordination information for calculating an output value which each storage battery is caused to output, based on a bus voltage value and a target voltage value; a string output calculating unit which calculates, based on the coordination information, an output target value indicating the output value which the storage battery is caused to output to maintain the bus voltage value at the target voltage value; and a control unit which causes, among the storage batteries, a storage battery corresponding to the calculated output target value to output an output having a magnitude indicated by the calculated output target value, wherein the coordination unit generates the coordination information to avoid simultaneous presence of a storage battery that outputs an output in a charge direction and a storage battery that outputs an output in a discharge direction.

10 Claims, 15 Drawing Sheets

CHARGE AND DISCHARGE CONTROL DEVICE AND CHARGE AND DISCHARGE CONTROL METHOD

TECHNICAL FIELD

The present invention relates to charge and discharge control devices or the like. In particular, the present invention relates to a charge and discharge control device or the like that controls an output value which each of storage batteries is caused to output, to maintain a voltage value of a DC bus at a predetermined target voltage value.

BACKGROUND ART

A charge and discharge control device that controls an amount of charge or discharge (hereinafter, also referred to as charge and discharge) of a storage battery in a storage battery system has been disclosed so far (see Patent Literatures (PTLs) 1 to 3, for instance).

CITATION LIST

Patent Literature

[PTL 1] International Publication No. WO 2011/132311
[PTL 2] Japanese Unexamined Patent Application Publication No. 2008-42999
[PTL 3] Japanese Unexamined Patent Application Publication No. 2009-213288

SUMMARY OF INVENTION

Technical Problem

However, in the charge and discharge device according to the conventional technique, the storage battery charges and discharges wastefully.

In view of this, the present invention has an object to provide a charge and discharge control device capable of controlling power wastefully charged and discharged by a storage battery.

Solution to Problem

A storage battery system according to an aspect of the present invention includes: a plurality of storage batteries connected in parallel and connected to a DC bus, which is connected to an inverter; and a coordination control unit configured to generate coordination information that is information for determining an output target value of current or power with which each storage battery unit outputs in a charge direction or a discharge direction in order to approximate a bus voltage value to a predetermined target voltage value, and transmit the coordination information generated to the storage battery units, the bus voltage value being a voltage value of the DC bus, wherein said each storage battery unit includes: at least one storage battery; and a DC-DC converter, which is provided between the at least one storage battery and the DC bus, and which controls charging and discharging of the at least one storage battery based on the coordination information, the DC-DC converter includes: an output determining unit configured to determine, based on the coordination information transmitted by the coordination control unit, the output target value corresponding to current or power for which the at least one storage battery connected to the DC-DC converter is caused to output; and a control unit configured to cause the at least one storage battery to output the current or the power corresponding to the output target value, and the coordination control unit is configured to cause directions of current or power output in order to approximate the bus voltage value to the target voltage value to be in an identical direction in all the storage battery units, by transmitting the coordination information to the storage battery units, the identical direction being either in the charge direction or in the discharge direction.

It is to be noted that the present invention can be realized not only as such a charge and discharge control device, but also as a charge and discharge control method having, as steps, the characteristic units included in the charge and discharge control device, and as a program causing a computer to execute such characteristic steps. It goes without saying that such a program can be distributed through a recording medium such as a CD-ROM (Compact Disc Read Only Memory) and a transmission medium such as the Internet.

Furthermore, the present invention can be realized as a semiconductor integrated circuit (LSI) that achieves part or all of functions of the charge and discharge control device, and as a storage battery system including the charge and discharge control device.

Advantageous Effects of Invention

As stated above, the present invention provides a charge and discharge control device that controls power wastefully charged and discharged by a storage battery.

DESCRIPTION OF EMBODIMENTS (Underlying Knowledge Forming Basis of Present Invention)

In relation to the charge and discharge control device disclosed in the Background Art section, the inventors have found the following problems.

Generally speaking, a storage battery deteriorates by being repeatedly charged and discharged.

Moreover, the storage battery is connected to a DC bus through a DC-DC converter in a charge and discharge system. For instance, the DC-DC converter raises or reduces a voltage power of power output from the storage battery to a more appropriate voltage value, and then outputs the power to the DC bus. Here, power loss occurs due to the DC-DC converter.

Therefore, to increase power efficiency and extend the life of the storage battery, it is desirable to reduce power the storage battery charges and discharges as much as possible.

In Patent Literatures (PTLs) 1 to 3, DC-DC converters according to the related art cause storage batteries connected to the respective DC-DC converters to charge and discharge to keep a voltage of a DC bus constant. Here, the following cases are assumed: (1) a lag between timings for measuring voltage of the DC bus occurs between the DC-DC converters; and (2) an error of a voltage sensor that measures voltage of the DC bus varies greatly. In these cases, directions of current values which are calculated by the respective DC-DC converters and which storage batteries are caused to output may not match each other.

As described later, when the directions of the current output from the storage batteries to the DC bus are different, unnecessary power is always consumed. However, the DC-DC converter according to the conventional technique has no mechanism for cooperating with other DC-DC converters regarding directions of current when storage batteries are caused to charge and discharge. As a result, the DC-DC converters may control the storage batteries to cause the storage batteries to charge and discharge wastefully. The following specifically describes the case with reference to FIG. 1A and FIG. 1B.

Figure 1A:
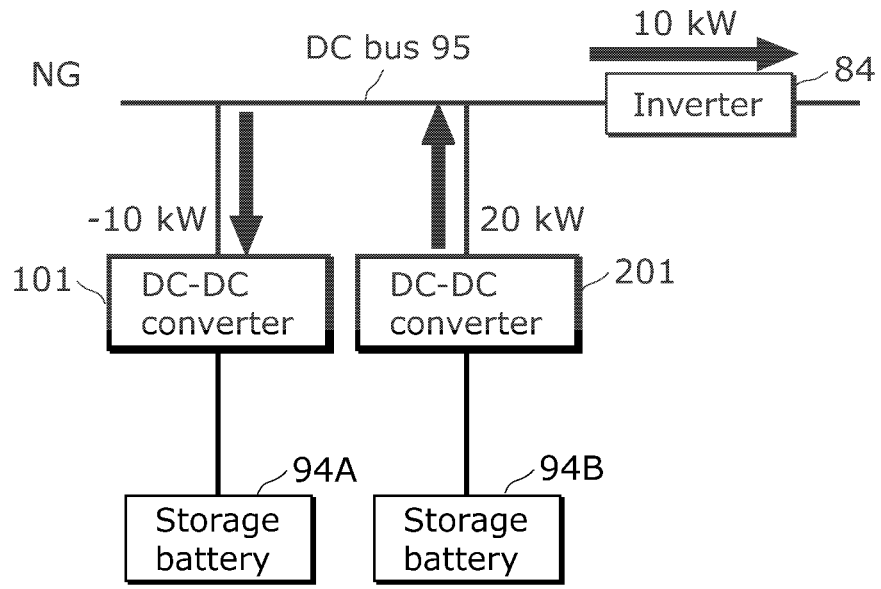
FIG. 1A is a diagram showing a situation where each of DC-DC converters according to the related art controls charging and discharging of a corresponding one of storage batteries to keep a voltage of a DC bus constant.

FIG. 1A is a diagram showing a situation where each of DC-DC converters according to the related art controls charging and discharging of a corresponding one of storage batteries, to keep a voltage of a DC bus constant. In contrast, FIG. 1B is a diagram showing a situation where each of DC-DC converters according to an aspect of the present invention controls charging and discharging of a corresponding one of storage batteries, to keep a voltage of a DC bus constant.

In FIG. 1A, a DC-DC converter 101 causes a storage battery 94A to output −10 kW (i.e., to charge 10 kW), and a DC-DC converter 201 causes a storage battery 94B to output 20 kW (i.e., to discharge 20 kW).

Figure 1B:
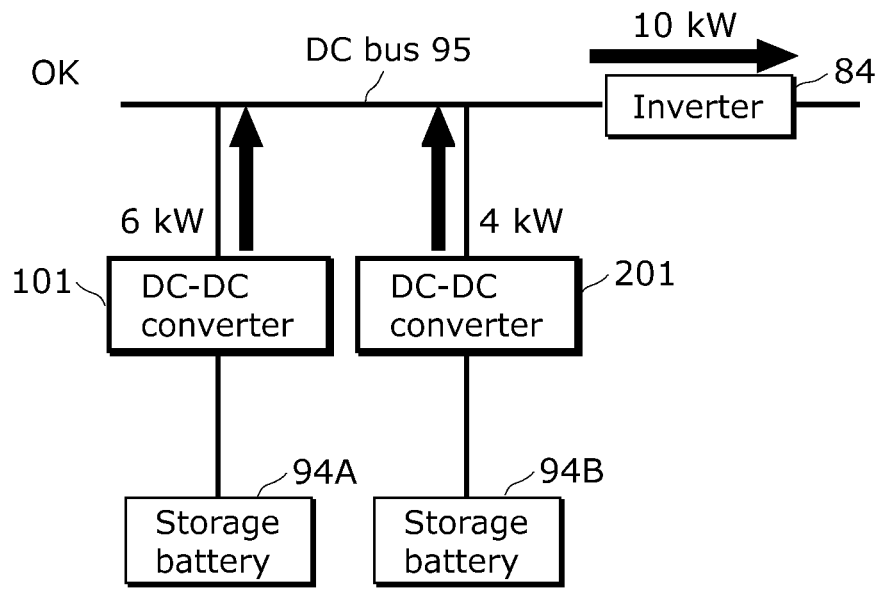
FIG. 1B is a diagram showing a situation where each of DC-DC converters according to an aspect of the present invention controls charging and discharging of a corresponding one of storage batteries to keep a voltage of a DC bus constant.

In FIG. 1B, a DC-DC converter 101 causes a storage battery 94A to output 6 kW (i.e., to discharge 6 kW), and a DC-DC converter 201 causes a storage battery 94B to output 4 kW (i.e., to discharge 4 kW).

In both cases of FIG. 1A and FIG. 1B, an inverter 84 outputs 10 kW of power. However, suppose that the DC-DC converter 101 and the DC-DC converter 201 have power conversion efficiency of 95%, in the case of FIG. 1A, power loss caused by the DC-DC converters is calculated as (10 kW+20 kW)×0.05=1.5 kW. In contrast, in the case of FIG. 1B, power loss caused by the DC-DC converters is calculated as (6 kW+4 kW)×0.05=0.5 kW.

It is clear from the above examination that more power is lost when the directions of the current (or power) output by the DC-DC converters are different than when the directions are the same. Moreover, an absolute value of the current output by each storage battery is greater when the directions of the current are different. Thus, the storage batteries deteriorate more progressively when the directions of the current are different.

In order to solve such problems, a charge and discharge control device according to an aspect of the present invention is a charge and discharge control device that controls an output value indicating magnitude of current or power which each of storage batteries connected in parallel to a DC bus outputs when charging or discharging, to maintain a bus voltage value that is a voltage value of the DC bus at a predetermined target voltage value, the device including: a coordination unit configured to generate coordination information that is information for calculating the output value which each storage battery is caused to output, based on the bus voltage value and the target voltage value; a string output calculating unit configured to calculate, based on the coordination information, an output target value indicating the output value which the storage battery is caused to output to maintain the bus voltage value at the target voltage value; and a control unit configured to cause, among the storage batteries, a storage battery corresponding to the calculated output target value to output an output that is current or power having magnitude indicated by the calculated output target value, wherein the coordination unit is configured to generate the coordination information to avoid simultaneous presence of, among the storage batteries, a storage battery that outputs an output in a charge direction and a storage battery that outputs an output in a discharge direction.

With this, the charge and discharge control device makes it possible to prevent the storage battery that outputs the output in the charge direction and the storage battery that outputs the output in the discharge direction from being simultaneously included in the storage batteries, using the coordination information. As a result, it is possible to control an amount of power that each of the storage batteries of which charging and discharging are controlled by the charge and discharge control device wastefully charges and discharges with respect to the DC bus.

For instance, the coordination unit may include: a bus voltage obtaining unit configured to obtain the bus voltage value; a charge and discharge output calculating unit configured to calculate, based on a difference between the target voltage value and the bus voltage value, a charge and discharge output value indicating a total output value which the storage batteries are caused to output in order to approximate the bus voltage value to the target voltage value; and an output ratio calculating unit configured to calculate an output ratio indicating a ratio between the output values which the storage batteries output when the storage batteries are caused to output the outputs each having magnitude indicated by the calculated charge and discharge output value, the output ratio calculating unit may calculate the output ratio to avoid the simultaneous presence of, among the storage batteries, the storage battery that outputs the output in the charge direction and the storage battery that outputs the output in the discharge direction, and the coordination unit may generate the charge and discharge output value and the output ratio as the coordination information.

Using the charge and discharge output value and the output ratio specifically as the coordination information makes it possible to prevent the directions of the current which the respective storage batteries output to the DC bus from having different signs.

Moreover, the output ratio calculating unit may calculate the output ratio based on information indicating at least one of a condition and a charge level of each of the storage batteries.

With this, the charge and discharge control device makes it possible to further suppress the deterioration of the connected storage batteries.

Furthermore, the coordination unit may include: a first bus voltage obtaining unit configured to obtain a first bus voltage value; and a charge and discharge direction calculating unit configured to calculate, based on a difference between the target voltage value and the first bus voltage value, a charge and discharge direction indicating a direction of the output which each of the storage batteries outputs in order to approximate the first bus voltage value to the target voltage value, the string output calculating unit may include a second bus voltage obtaining unit configured to obtain a second bus voltage value, the coordination unit may transmit the charge and discharge direction as the coordination information to the string output calculating unit corresponding to each of the storage batteries, the charge and discharge direction calculating unit may calculate the charge and discharge direction to avoid simultaneous presence of, among the storage batteries, storage batteries having different output directions, and the string output calculating unit may calculate the output target value based on the obtained charge and discharge direction and a value corresponding to a difference between the second bus voltage value and the target voltage value.

Using the charge direction specifically as the coordination information makes it possible to prevent the directions of the current which the respective storage batteries output to the DC bus from having different signs.

Moreover, the string output calculating unit may: calculate the output target value to be less than or equal to a predetermined value when a direction of an output for offsetting the difference between the second bus voltage value and the target voltage value is different from a direction indicated by the obtained charge and discharge direction; and calculate the output target value indicating an output which (i) has a greater absolute value when the difference between the second bus voltage value and the target voltage value is greater and (ii) flows in the direction indicated by the obtained charge and discharge direction, when the direction of the output for offsetting the difference is identical with the direction indicated by the obtained charge and discharge direction.

With this, even when an error is included in the bus voltages measured by the respective DC-DC converters, it is possible to properly control the charging and discharging of the storage batteries without causing the control to be unstable.

Furthermore, the coordination unit may further include a limiting value determining unit configured to determine a limiting value indicating a range of the output value which each of the storage batteries outputs, and the charge and discharge device may further include a limit unit configured to adjust the output target value calculated by the string output calculating unit, to allow the output target value to be included in the range indicated by the limiting value, when the output target value is not in the range.

With this, it is possible to prevent the storage batteries from excessively discharging or charging. As a result, it is possible to further suppress the deterioration of the storage batteries.

For example, the limiting value determining unit may determine a range of the limiting value to prevent each of the storage batteries from being in at least one of an excess discharging state and an excess charging state, when each storage battery is caused to output an output value in the range of the limiting value corresponding to the storage battery.

A charge and discharge control method according to another aspect of the present invention is a charge and discharge control method for controlling an output value indicating magnitude of current or power which each of storage batteries connected in parallel to a DC bus outputs when charging or discharging, to maintain a bus voltage value that is a voltage value of the DC bus at a predetermined target voltage value, the method including: generating coordination information that is information for calculating the output value which each storage battery is caused to output, based on the bus voltage value and the target voltage value; calculating, based on the coordination information, an output target value indicating the output value which the storage battery is caused to output; and causing, among the storage batteries, a storage battery corresponding to the calculated output target value to output an output that is current or power having magnitude indicated by the calculated output target value, wherein in generating, the coordination information is generated to avoid simultaneous presence of, among the storage batteries, a storage battery that outputs an output in a charge direction and a storage battery that outputs an output in a discharge direction.

A storage battery system according to a further aspect of the present invention includes a charge and discharge control device and storage batteries connected to a DC bus and controlled by the charge and discharge control device.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments of the present invention are described in detail with reference to the drawings. Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the appended Claims and their equivalents. Therefore, among the structural elements in the following embodiments, structural elements not recited in any one of the independent claims are described as arbitrary structural elements.

Embodiment 1

Figure 2:
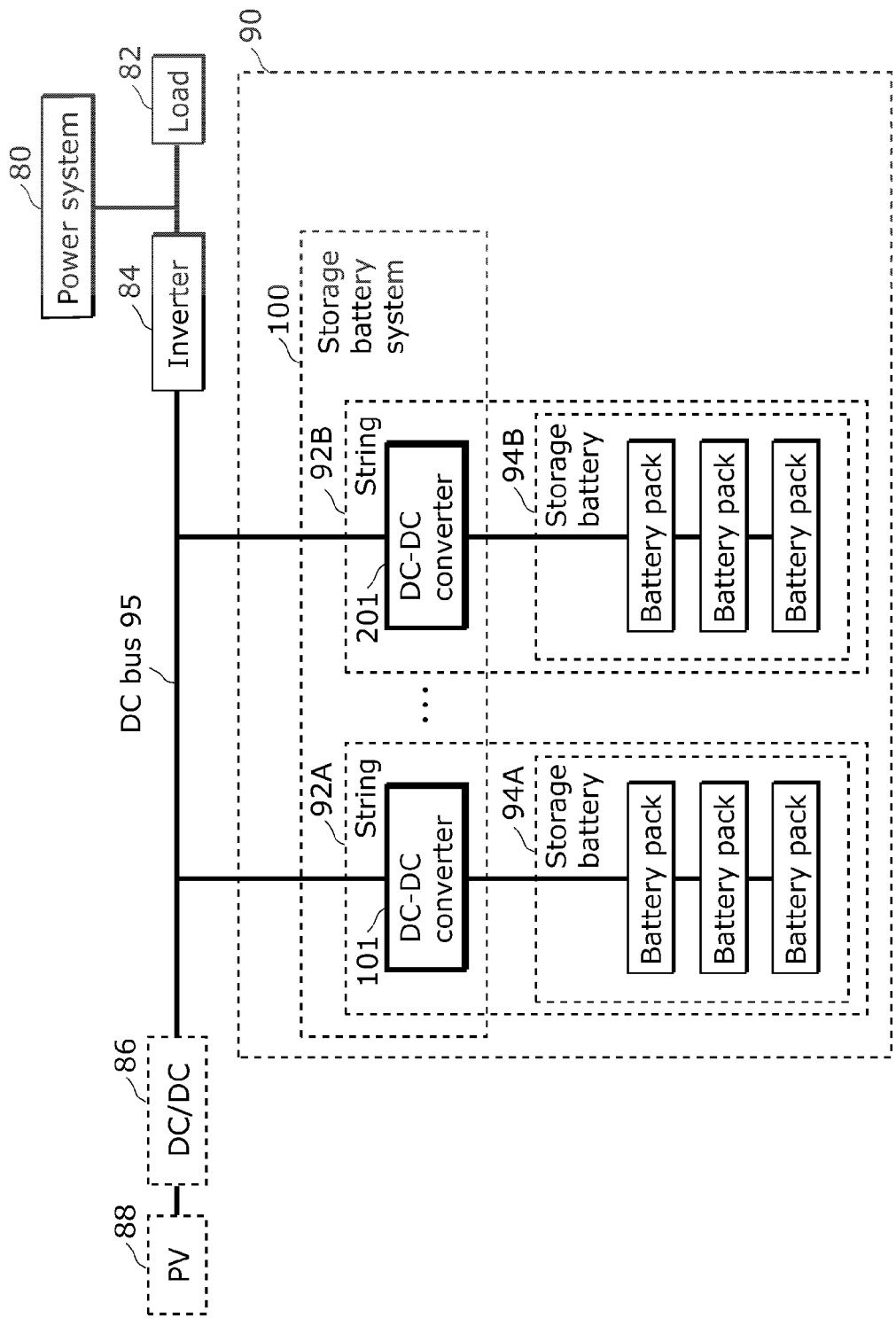
FIG. 2 is a diagram showing an outline of a storage battery system including a charge and discharge control device according to Embodiments 1 and 2 and their modifications.

FIG. 2 shows an outline of a storage battery system 90 including a charge and discharge control device 100 according to Embodiment 1. The storage battery system 90 is provided for each consumer, for instance.

As shown in FIG. 2, the storage battery system 90 includes the charge and discharge control device 100, a storage battery 94A, and a storage battery 94B. The storage batteries 94A and 94B are connected in parallel to a DC bus 95 through the charge and discharge control device 100.

Moreover, a photovoltaic (PV) system 88 is connected to the DC bus 95 through a DC-DC converter 86. Furthermore, the DC bus 95 is connected to a grid 80 and a load 82 through an inverter 84. The load 82 is, for instance, a home appliance such as an air conditioner and a lighting apparatus.

Power generated by the PV system 88 and power purchased from the grid 80 are charged to the storage battery 94A and the storage battery 94B.

Moreover, power discharged from the storage battery 94A and the storage battery 94B is consumed by the load 82. In addition, the power discharged from the storage battery 94A and the storage battery 94B may be sold through reverse power flow to the grid 80. It is to be noted that this Description defines a case where a storage battery outputs a positive current as discharging and a case where a storage battery outputs a negative current as charging. Moreover, an example of the storage battery is a storage battery of a given type such as a lithium ion battery, a lead storage battery, a sodium-sulfur battery, and a nickel-cadmium battery.

The charge and discharge control device 100 includes a DC-DC converter 101 and a DC-DC converter 201. Each of the DC-DC converter 101 and the DC-DC converter 201 controls charging and discharging of a corresponding one of the storage battery 94A and the storage battery 94B. The DC-DC converter 101 and the storage battery 94A constitute a string 92A. The DC-DC converter 201 and the storage battery 94B constitute a string 92B.

It is to be noted that the PV system 88 is an example, and instead of the PV system 88, any power generator provided for a consumer such as a wind power generation system and a fuel cell system may be connected to the DC bus 95. In addition, a power generator such as the PV system 88 and the DC-DC converter 86 may not necessarily be connected to the DC bus 95.

The numbers of the elements shown in FIG. 2 are an example. For instance, the storage battery system 90 may include three or more DC-DC converters each connected to a storage battery. Moreover, the storage battery may have one or more battery packs that are connected in series or parallel.

Next, a specific example of the configuration of the charge and discharge control device 100 is described with reference to FIG. 3 and FIG. 4.

Figure 3:
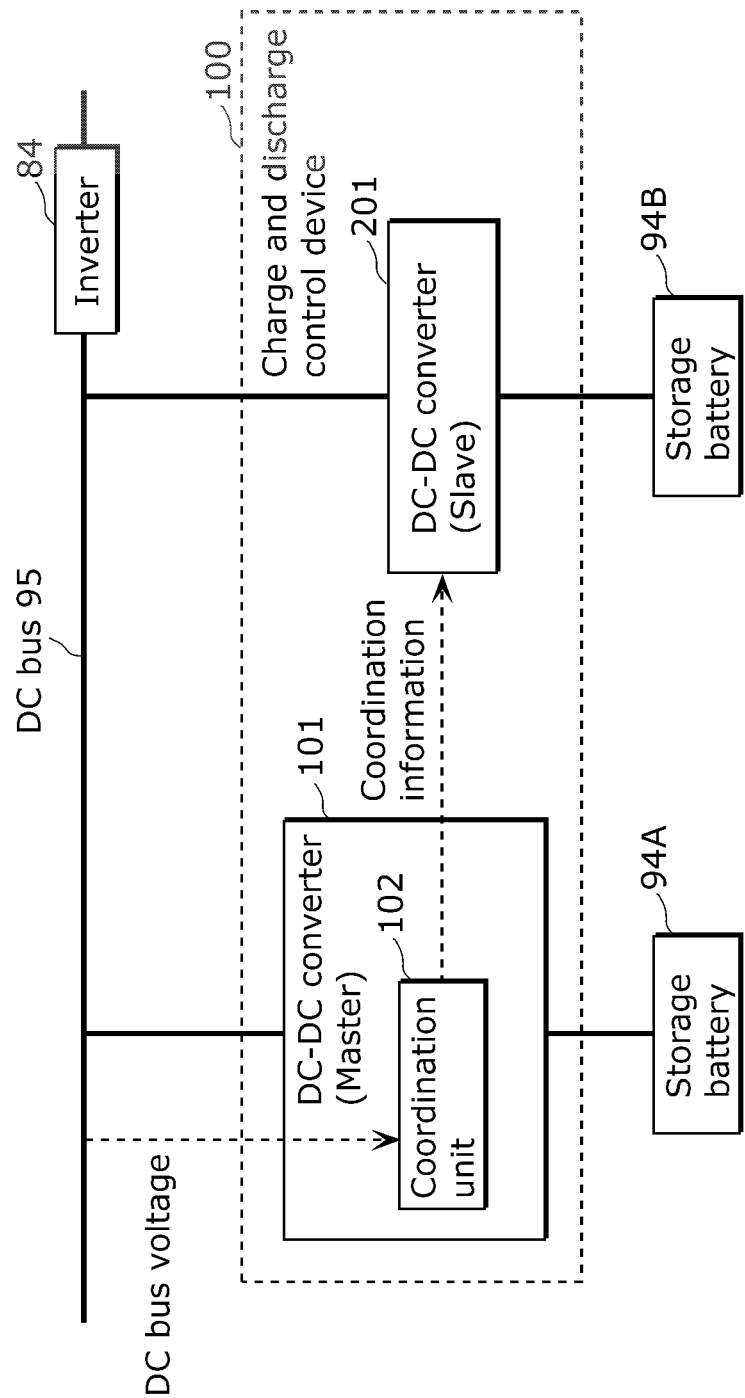
FIG. 3 is a diagram showing an exemplary configuration of the storage battery system including a charge and discharge control device according to Embodiments 1 and 2 and their modifications.

FIG. 3 shows an exemplary configuration of the charge and discharge control device 100. As shown in FIG. 3, the charge and discharge control device 100 includes the DC-DC converter 101 with a coordination unit 102, and the DC-DC converter 201 without the coordination unit 102. Hereinafter, the DC-DC converter with the coordination unit 102 is also referred to as a master, and the DC-DC converter without the coordination unit 102 is also referred to as a slave.

As described later, the coordination unit 102 obtains a bus voltage of the DC bus 95. In addition, the coordination unit 102 transmits to the DC-DC converter 201 coordination information for allowing, based on the obtained bus voltage and a predetermined target voltage value, a direction of current the DC-DC converter 101 causes the storage battery 94A to output and a direction of current the DC-DC converter 201 causes the storage battery 94B to output to be the same. In this case, the coordination unit 102 can transmit the coordination information to the DC-DC converter 201, using a given communication path that is wired or wireless.

Figure 4:
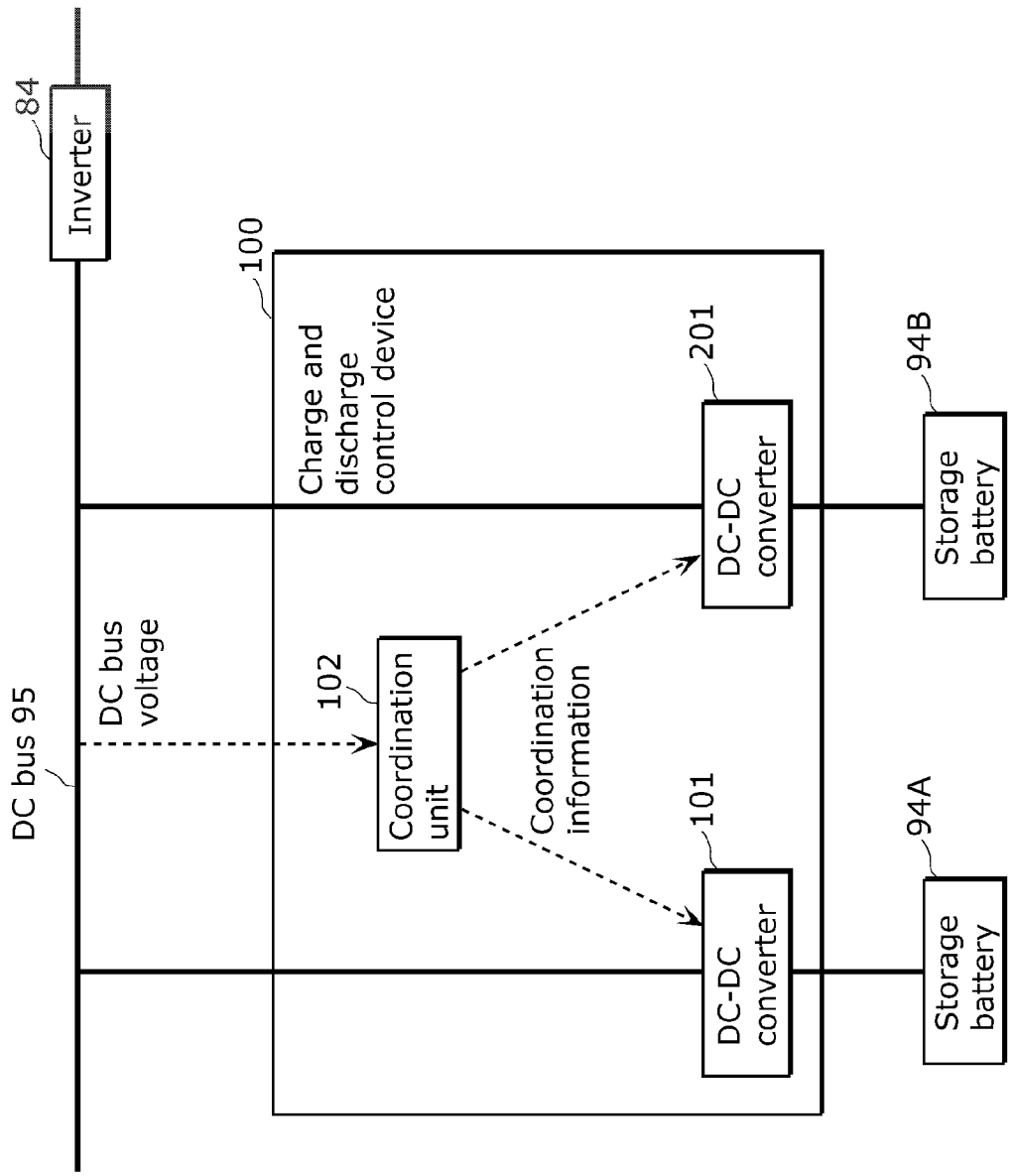
FIG. 4 is a diagram showing another exemplary configuration of the storage battery system including a charge and discharge control device according to Embodiments 1 and 2 and their modifications.

FIG. 4 shows another exemplary configuration of the charge and discharge control device 100. As shown in FIG. 4, the coordination unit 102 is located outside of the DC-DC converter 101 and the DC-DC converter 201. In this case, the coordination unit 102 transmits the coordination information to the DC-DC converter 101 and the DC-DC converter 201. Here, the coordination unit 102 can transmit the coordination information to each of the DC-DC converter 101 and the DC-DC converter 201, using a given communication path that is wired or wireless.

Figure 5:
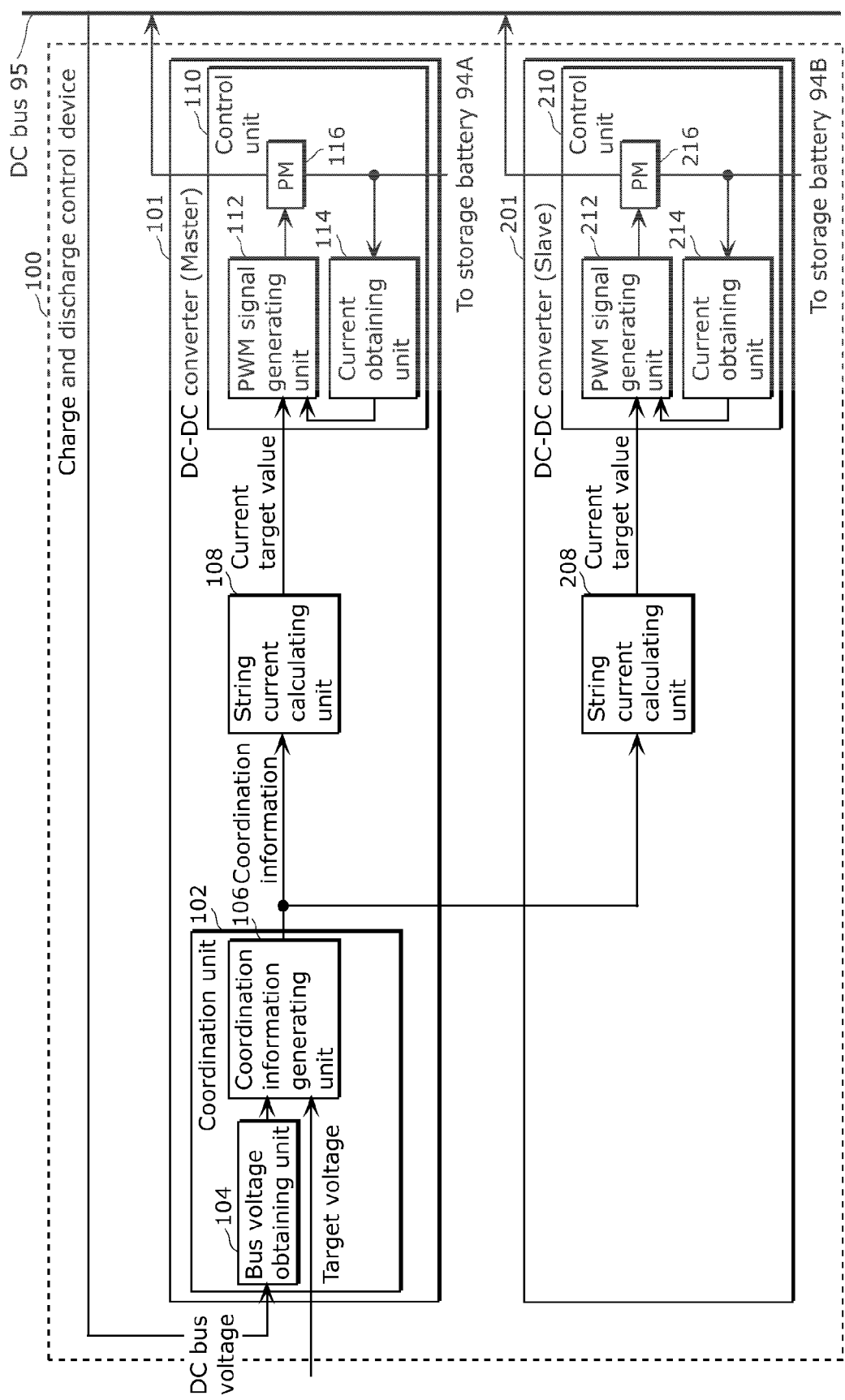
FIG. 5 is a diagram showing functional blocks of a charge and discharge control device according to Embodiment 1.

Next, FIG. 5 shows functional blocks of the charge and discharge control device 100 according to this embodiment.

The charge and discharge control device 100 controls a current value output by each of storage batteries connected in parallel to the DC bus 95 when the storage battery charges or discharges, to maintain a bus voltage (also referred to as a DC bus voltage) value, a voltage value of the DC bus 95, at a predetermined target voltage value.

As shown in FIG. 5, the charge and discharge control device 100 includes the DC-DC converter 101 and the DC-DC converter 201.

The DC-DC converter 101 is connected to the DC bus 95 and the corresponding storage battery 94A. The DC-DC converter 201 is connected to the DC bus 95 and the corresponding storage battery 94B.

The DC-DC converter 101 includes the coordination unit 102, a string current calculating unit 108, and a control unit 110. In contrast, the DC-DC converter 201 includes a string current calculating unit 208 and a control unit 210.

The coordination unit 102 generates, based on a bus voltage value and a target voltage value, coordination information that is information for calculating a current value that each of storage batteries is caused to output. At this time, the coordination unit 102 generates the coordination information to avoid simultaneous presence of, among the storage batteries, a storage battery that outputs current in a charge direction and a storage battery that outputs current in a discharge direction. The coordination information generated by the coordination unit 102 is simultaneously transmitted to all of the string current calculating units included in the charge and discharge control device 100.

Each of the string current calculating units 108 and 208 calculates current output by a corresponding one of strings, based on the coordination information. Here, each of the strings includes a storage battery and a DC-DC converter that controls charging and discharging of the storage battery. To put it another way, each string current calculating unit calculates a current target value that indicates a current value output by a corresponding one of the storage batteries 94A and 94B, the storage batteries, based on the coordination information. The current target value calculated by the string current calculating unit is transmitted to a control unit corresponding to the string current calculating unit that has calculated the current target value. Specifically, the current target value calculated by the string current calculating unit 108 is transmitted to the control unit 110. In addition, the current target value calculated by the string current calculating unit 208 is transmitted to the control unit 210.

Each of the control units causes a corresponding one of the storage batteries to output current having magnitude indicated by the current target value. Specifically, the control unit 110 causes the storage battery 94A to output current having magnitude indicated by the current target value received from the string current calculating unit 108. In addition, the control unit 210 causes the storage battery 94B to output current having magnitude indicated by the current target value received from the string current calculating unit 208.

In more detail, the coordination unit 102 includes a bus voltage obtaining unit 104 and a coordination information generating unit 106.

The bus voltage obtaining unit 104 obtains the bus voltage of the DC bus 95.

The coordination information generating unit 106 generates coordination information based on a value of the bus voltage obtained by the bus voltage obtaining unit 104 and a predetermined target voltage value. The target voltage value is stored in a storage unit (not shown) such as a ROM (Read Only Memory) and a RAM (Random Access Memory) included in the charge and discharge control device 100, for example. Moreover, the charge and discharge control device 100 may obtain a target voltage value input by an operation of a user. It is to be noted that the details of the coordination information are described later.

The control unit 110 includes a pulse width modulation (PWM) signal generating unit 112, a current obtaining unit 114, and a power module (PM) 116. The control unit 210 includes a PWM signal generating unit 212, a current obtaining unit 214, and a PM 216.

Each of the PWM signal generating units 112 and 212 is a circuit that generates a PWM signal for driving a PM to drive a corresponding PM. Specifically, each of the PWM signal generating units 112 and 212 performs feedback control based on a deviation between a current target value and a current value corresponding to the current target value and output by a storage battery, to determine a duty cycle of a pulse signal to be output. Examples of the feedback control include, but are not limited to, PI control and PID control.

Each of the current obtaining units 114 and 214 obtains a current value from a corresponding one of the storage batteries 94A and 94B, and outputs the current value to a corresponding one of the PWM signal generating units.

Each of the PMs 116 and 216 is a power module such as an insulated gate bipolar transistor (IGBT) and a power metal-oxide-semiconductor field-effect transistor (MOSFET).

It is to be noted that although FIG. 5 shows the functional blocks corresponding to the configuration of the charge and discharge control device 100 in which the DC-DC converter shown in FIG. 3 includes the coordination unit 102, a configuration of the charge and discharge control device 100 is not limited to this as above. For instance, as shown in FIG. 4, the charge and discharge control device 100 may include the coordination unit 102 and the DC-DC converters as separate devices or modules.

Figure 6:
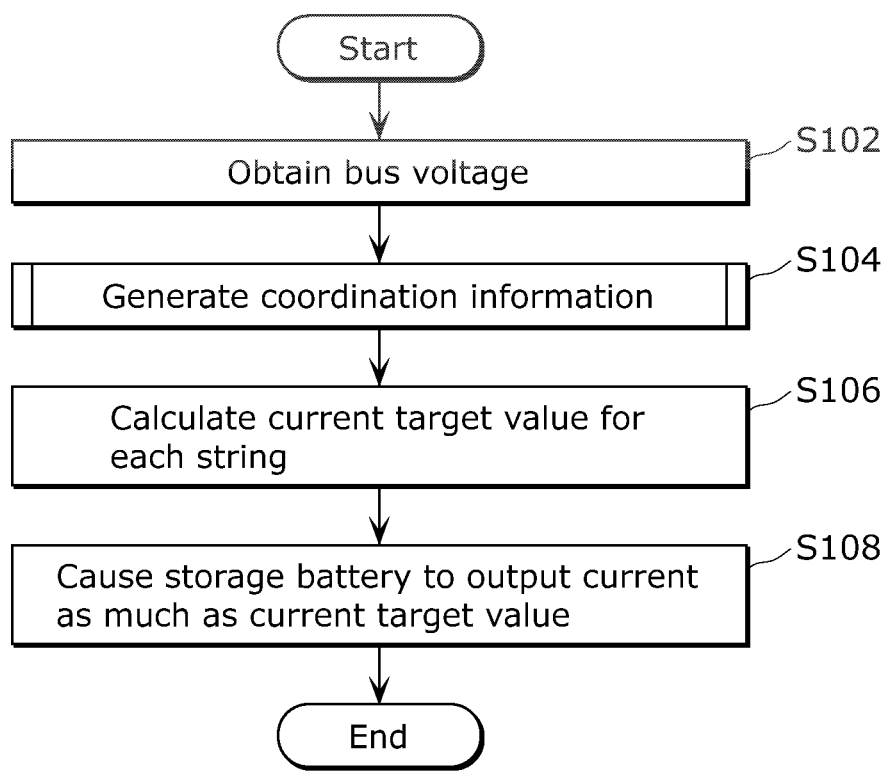
FIG. 6 is a flow chart showing an exemplary flow of processing performed by the charge and discharge control device according to Embodiment 1.

FIG. 6 shows an exemplary flow of processing performed by the charge and discharge control device 100 according to this embodiment.

First, the bus voltage obtaining unit 104 obtains a bus voltage of the DC bus 95 (S102).

Next, the coordination information generating unit 106 generates coordination information from a target voltage value and the bus voltage (S104).

Next, each of the string current calculating units 108 and 208 calculates a current target value for a corresponding one of the strings (S106).

Finally, the control unit 110 causes the corresponding storage battery to output current indicated by the current target value (S108).

As stated above, in the charge and discharge control device 100 according to this embodiment, the storage batteries do not simultaneously output, among the current output by the respective strings, the current in the charge direction and the current in the discharge direction. Thus, it is possible to control an amount of power that each of the storage batteries of which charging and discharging are controlled by the charge and discharge control device 100 wastefully charges and discharges with respect to the DC bus 95.

The following describes the charge and discharge control device according to this embodiment, especially processing performed by the coordination unit in more detail.

Figure 7:
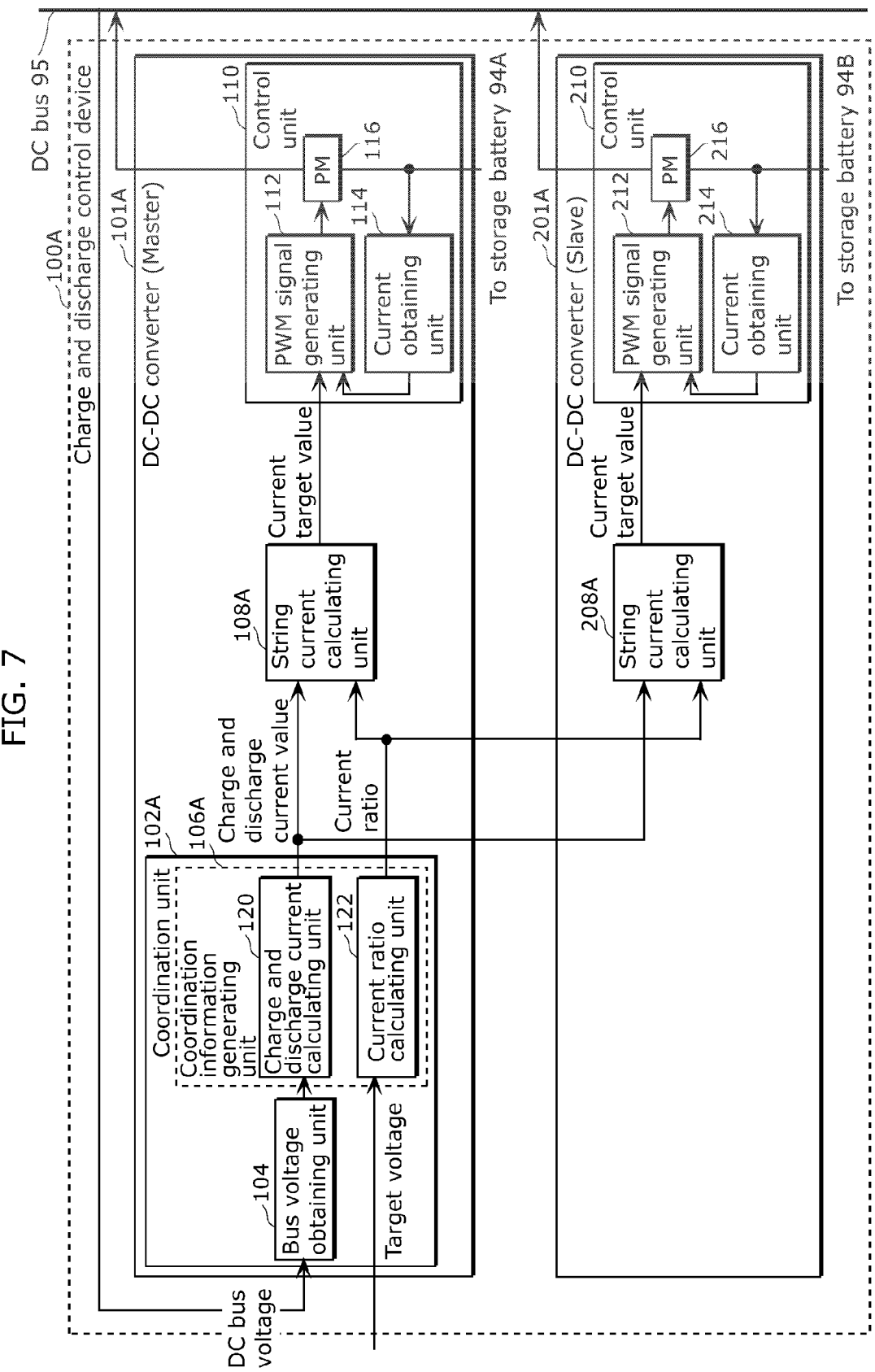
FIG. 7 is a diagram showing more detailed functional blocks of the charge and discharge control device according to Embodiment 1.

FIG. 7 shows functional blocks of a charge and discharge control device 100A that is the charge and discharge control device according to this embodiment and uses, as coordination information, (i) a charge and discharge current value indicating a total current value that storage batteries are caused to output and (ii) a current ratio indicating a load of each of the storage batteries when the storage battery outputs the charge and discharge current value. It is to be noted that elements that are the same as those of the charge and discharge control device 100 shown in FIG. 5 are represented by the same reference signs, and a detailed description of the elements is omitted.

As shown in FIG. 7, the charge and discharge control device 100A includes a coordination unit 102A, string current calculating units 108A and 208A, and the control units 110 and 210. The coordination unit 102A, the string current calculating unit 108A, and the control unit 110 constitute a DC-DC converter 101A. In contrast, the string current calculating unit 208A and the control unit 210 constitute a DC-DC converter 201A.

The coordination unit 102A includes the bus voltage obtaining unit 104 and a coordination information generating unit 106A.

The coordination information generating unit 106A generates coordination information including the above-mentioned charge and discharge current value and current ratio. In more detail, the coordination information generating unit 106A includes a charge and discharge current calculating unit 120 and a current ratio calculating unit 122.

By dividing, for instance, a difference between a target voltage value and a bus voltage value by a predetermined impedance, the charge and discharge current calculating unit 120 calculates a charge and discharge current value indicating a total current value that storage batteries are caused to output to approximate the bus voltage value to the target voltage value.

When the storage batteries are caused to output current having magnitude indicated by the calculated charge and discharge current value, the current ratio calculating unit 122 calculates a current ratio indicating a ratio between current values to be output by the storage batteries. In more detail, the current ratio calculating unit 122 calculates the current ratio to avoid simultaneous presence of, among the storage batteries, a storage battery that outputs current in a charge direction and a storage battery that outputs current in a discharge direction.

For example, the current ratio calculating unit 122 may calculate the current ratio based on at least one of a condition and a charge level of each storage battery. Here, information indicating the condition of the storage battery is considered as a value such as a State of Health (SOH), the number of cycles of a storage battery, and an operation time. In addition, information indicating the charge level of the storage battery is considered as a value such as a State of Charge (SOC).

Specifically, for instance, it is conceivable that the current ratio calculating unit 122 determines the current ratio to cause a healthier storage battery to output more current. For example, the current ratio calculating unit 122 may determine the current ratio to cause a storage battery with a better SOH to output more current.

Moreover, the current ratio calculating unit 122 may determine the current ratio to cause a storage battery with a better SOC to output more current. Furthermore, the current ratio calculating unit 122 may determine the current ratio to cause a storage battery with a less number of cycles and a shorter operation time to output more current.

Moreover, the current ratio calculating unit 122 may change the current ratio between the time of charging and the time of discharging. Specifically, the current ratio calculating unit 122 may determine the current ratio to allow a storage battery with a better SOC to discharge more current. Furthermore, the current ratio calculating unit 122 may determine the current ratio to allow a storage battery with a worse SOC to charge more current.

It is to be noted that the current ratio calculating unit 122 may calculate the current ratio using a predetermined value (e.g., storage battery 94A:storage battery 94B=1:1).

The coordination unit 102A generates, as the coordination information, the charge and discharge current value calculated by the charge and discharge current calculating unit 120 and the current ratio calculated by the current ratio calculating unit 122.

Each one of the string current calculating units 108A and 208A calculates a target current value indicating a current value that a corresponding one of the storage batteries the one of the string current calculating units 108A and 208A controls is caused to output.

For instance, when a current ratio indicates that current satisfying the storage battery 94A:the storage battery 94B=1:2 needs to be output, and a charge and discharge current value is 12[A], a current target value calculated by the string current calculating unit 108A is 4[A]. In addition, a current target value calculated by the string current calculating unit 208A is 8[A].

Figure 8:
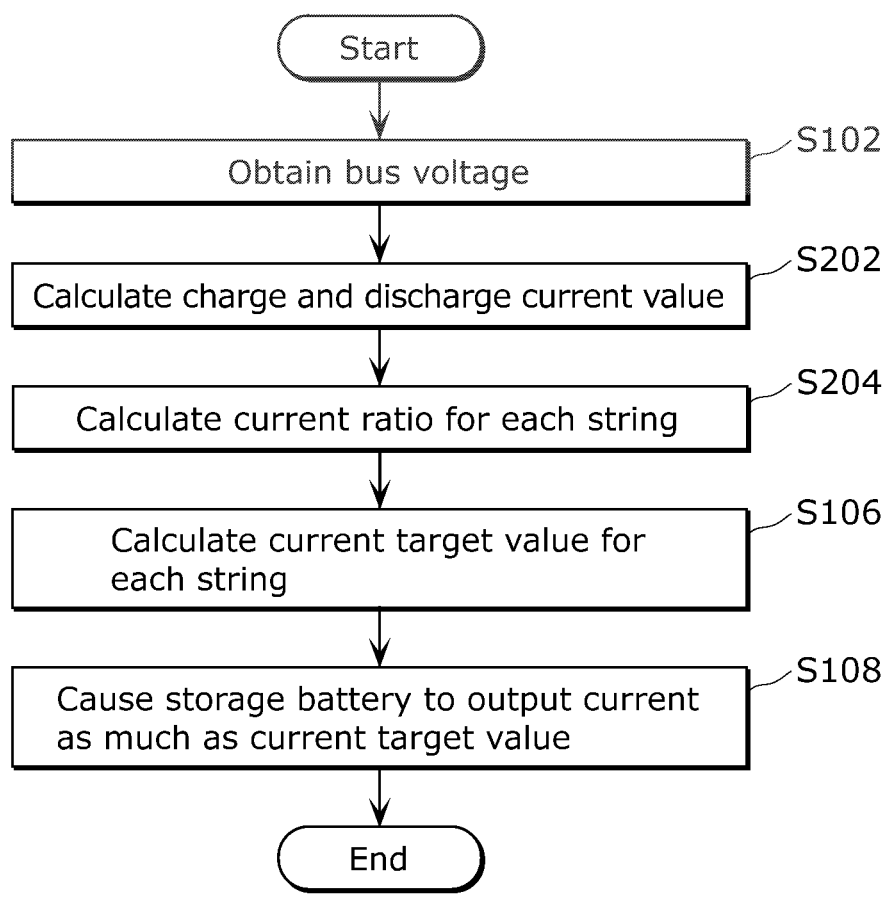
FIG. 8 is a flow chart showing a flow of more detailed processing performed by the charge and discharge control device according to Embodiment 1.

FIG. 8 is a flow chart showing a flow of processing performed by the charge and discharge control device 100A.

After the bus voltage obtaining unit 104 obtains a bus voltage (S102), the charge and discharge current calculating unit 120 calculates a charge and discharge current value (S202).

Next, the current ratio calculating unit 122 calculates a current ratio indicating a ratio between current values to be output by storage batteries (i.e., current values for respective strings) when the storage batteries as a whole bear current indicated by the charge and discharge current value (S204). Here, the current ratio calculating unit 122 calculates the current ratio to avoid simultaneous presence of current values having different signs among the current values output by the respective storage batteries. In other words, the current ratio calculating unit 122 calculates the current ratio to avoid simultaneous presence of, among the storage batteries controlled by the charge and discharge control device 100A, a storage battery that charges and a storage battery that discharges.

Next, each of the string current calculating units 108A and 208A calculates a current target value for a corresponding one of the strings (S106).

Finally, each of the control unit 110 and the control unit 210 causes a corresponding one of the storage batteries to output current indicated by the current target value (S108).

As described above, the charge and discharge control device 100A according to this embodiment makes it possible to prevent the storage battery that outputs the current in the charge direction and the storage battery that outputs the current in the discharge direction from being simultaneously present in the storage batteries, using the coordination information. As a result, it is possible to control an amount of power that each of the storage batteries of which charging and discharging are controlled by the charge and discharge control device 100A wastefully charges and discharges with respect to the DC bus 95.

Embodiment 2

The following describes Embodiment 2 in which charge and discharge directions indicating directions of current that storage batteries are caused to output are used as coordination information.

Figure 9:
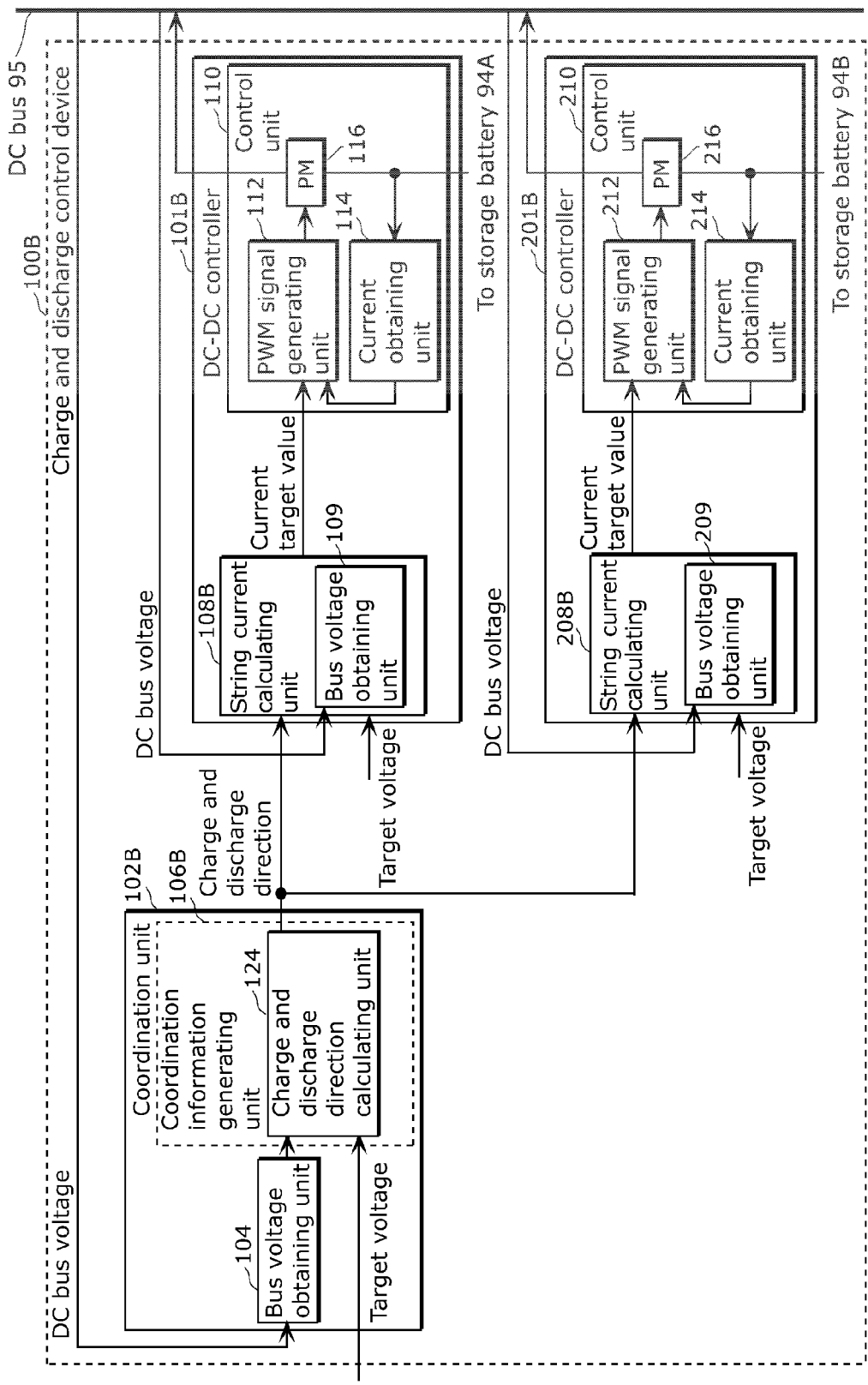
FIG. 9 is a diagram showing functional blocks of a charge and discharge control device according to Embodiment 2.

FIG. 9 shows functional blocks of a charge and discharge control device according to Embodiment 2.

As shown in FIG. 9, a charge and discharge control device 100B includes a coordination unit 102B and DC-DC converters 101B and 201B.

Each one of the DC-DC converters 101B and 201B calculates a current target value for a corresponding one of strings based on a charge and discharge direction obtained from the coordination unit 102B, a bus voltage of the DC bus 95 obtained by the one of the DC-DC converters 101B and 201B, and a predetermined target voltage.

In more detail, the coordination unit 102B includes the bus voltage obtaining unit 104 and a coordination information generating unit 106B which includes a charge and discharge direction calculating unit 124.

The bus voltage obtaining unit 104 obtains the bus voltage of the DC bus 95. In this embodiment, as described later, each of string current calculating units obtains a bus voltage independently. Thus, for the sake of identification, a value of the bus voltage obtained by the bus voltage obtaining unit 104 is referred to as a first bus voltage value.

The charge and discharge direction calculating unit 124 calculates, based on a difference between a target voltage value and the first bus voltage value, charge and discharge directions indicating directions of current that the storage batteries are caused to output to approximate the first bus voltage value to the target voltage value. At this time, the charge and discharge direction calculating unit 124 calculates the charge and discharge directions to avoid simultaneous presence of directions of currents having different signs in the directions of the currents that the respective storage batteries are caused to output.

As long as information such as "charge" and "discharge," "positive" and "negative," and "0" and "1" indicates whether a storage battery should charge or discharge, a given value may be used as a charge and discharge direction. When, for instance, a difference obtained by subtracting the first bus voltage value from the target voltage value is greater than or equal to 0, the charge and discharge direction calculating unit 124 needs to cause a storage battery to discharge current as much as a shortage of current. Accordingly, the charge and discharge direction calculating unit 124 transmits information indicating "discharge" as charge and discharge directions to all of the string current calculating units. In contrast, when the difference obtained by subtracting the first bus voltage value from the target voltage value is less than 0, the charge and discharge direction calculating unit 124 needs to cause the storage battery to absorb excess current. Accordingly, the charge and discharge direction calculating unit 124 transmits information indicating "charge" as charge and discharge directions to all of the string current calculating units.

The coordination information generating unit 106B transmits, as the coordination information, the charge and discharge directions calculated by the charge and discharge direction calculating unit 124 to the string current calculating units included in the DC-DC converters corresponding to the respective storage batteries.

Each of the DC-DC converters 101B and 201B includes a corresponding one of string current calculating units 108B and 208B.

Each of the string current calculating units 108B and 208B includes a corresponding one of bus voltage obtaining units 109 and 209 that obtain the bus voltage of the DC bus 95. It is to be noted that each of the bus voltage obtaining unit 104 and the bus voltage obtaining units 109 and 209 may obtain a bus voltage of the DC bus 95 measured by a different voltage sensor. Hereinafter, for illustrative purposes, a value of the bus voltage obtained by each of the bus voltage obtaining unit 109 and the bus voltage obtaining unit 209 is referred to as a second bus voltage value. In addition, the bus voltage obtaining unit 104 is also referred to as a first bus voltage obtaining unit, and the bus voltage obtaining unit 109 and the bus voltage obtaining unit 209 are also collectively referred to as a second bus voltage obtaining unit.

Each of the string current calculating units 108B and 208B calculates a current target value based on the obtained charge and discharge direction and a value corresponding to a difference between the second bus voltage value and the target voltage value.

In more detail, each one of the string current calculating units 108B and 208B calculates the current target value to be less than or equal to a predetermined value, when a direction of current for offsetting the difference between the second bus voltage value and the target voltage value obtained by the one of the string current calculating units 108B and 208B differs from a direction indicated by the obtained charge and discharge direction. In contrast, each one of the string current calculating units 108B and 208B calculates the current target value indicating current of which absolute value is larger for a greater difference and which flows in the direction indicated by the obtained charge and discharge direction, when the direction of the current for offsetting the difference between the second bus voltage value and the target voltage value is identical with the direction indicated by the obtained charge and discharge direction.

Specifically, each one of the string current calculating units 108B and 208B determines the current target value by feedback control such as PI control, to allow the bus voltage value obtained by the one of the string current calculating units 108B and 208B to match the target voltage value.

At this time, different timings with which the first bus voltage obtaining unit and the second bus voltage obtaining unit obtain bus voltages result in different bus voltage values to be obtained. In addition, an error of the voltage sensor used for obtaining a bus voltage may cause each bus voltage obtaining unit to obtain a different bus voltage value.

Consequently, for example, a case is conceivable where even when the coordination unit 102B determines that it is necessary to cause a storage battery to charge, it is determined as a result of feedback control performed by a string current calculating unit that it is necessary to cause the storage battery to discharge.

As stated above, when the charge and discharge directions calculated by the coordination unit 102B do not match the directions of the current target values corresponding to the respective strings and calculated by the string current calculating units through the feedback control, a determination made by the coordination unit 102B is preceded. Thus, when the directions of the current target values calculated by the respective string current calculating units do not match the obtained charge and discharge directions, the string current calculating units each output 0 as the current target value, for instance. Furthermore, since, for example, there is a possibility that an I component in the PI control contains an error, the I component may be reset to 0.

Figure 10:
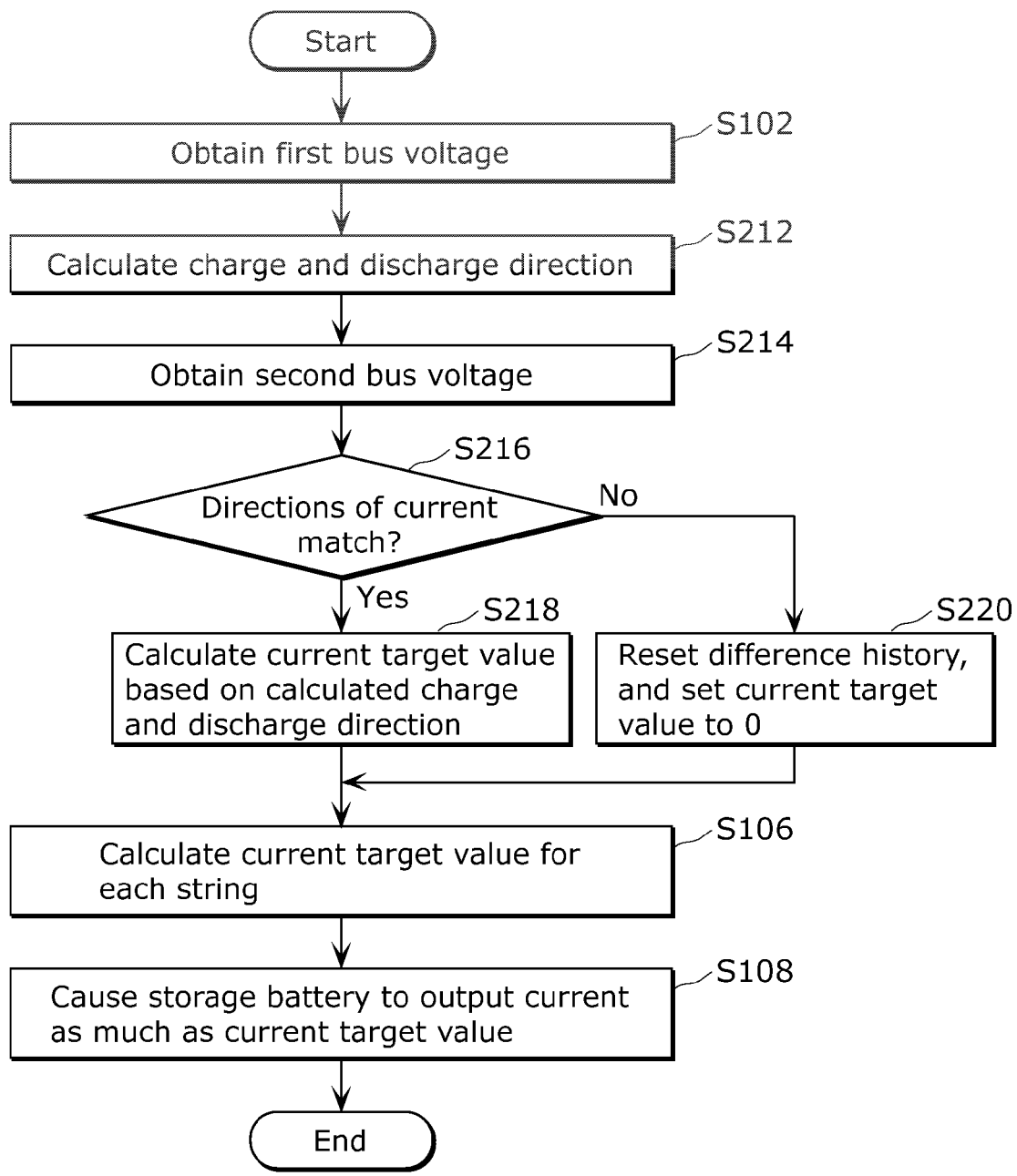
FIG. 10 is a flow chart showing a flow of processing performed by the charge and discharge control device according to Embodiment 2.

FIG. 10 shows a flow of processing performed by the charge and discharge control device 100B according to this embodiment.

First, the bus voltage obtaining unit 104 obtains a first bus voltage value (S102).

Next, the charge and discharge direction calculating unit 124 calculates a charge and discharge direction (S212).

Next, the bus voltage obtaining unit included in each of the DC-DC converters obtains a second bus voltage value that is a bus voltage value of the DC bus 95 (S214).

Subsequently, each one of the string current calculating units 108B and 208B checks a direction of current required to match the second bus voltage value obtained by the one of the string current calculating units 108B and 208B to a target voltage value. The checking can be performed by calculating a difference between the target voltage value and the second bus voltage value, for instance. Then, each string current calculating unit determines whether or not a direction of current indicated by the calculated current target value matches a direction of current indicated by the charge and discharge direction obtained from the coordination unit 102B (S216).

Here, when the directions of the current match each other (Yes in S216), the string current calculating unit calculates, through the feedback control such as the PI control, a current target value to match the second bus voltage value to the target voltage value, and outputs the calculated current target value (S218). In contrast, when the directions of the current do not match each other (No in S216), the string current calculating unit resets an I component indicating an error history, and sets 0 to the current target value (S220). It is to be noted that instead of 0, a value less than or equal to a predetermined value that is a value close to 0 may be used as the current target value in the step S220.

Finally, the control unit included in each DC-DC converter causes a corresponding one of the storage batteries to output current indicated by the current target value (S108).

As stated above, in the charge and discharge control device 100B according to this embodiment, by notifying each DC-DC converter of the common charge direction, the coordination unit 102B makes it possible to suppress the DC-DC converter causing the corresponding storage battery to charge and discharge wastefully.

(Modifications)

The following describes modifications of Embodiments 1 and 2 with reference to FIG. 11 to FIG. 13B. In the modifications, excess charging and discharging of a storage battery is prevented by applying a limiter to a current target value temporarily calculated by a string current calculating unit.

Figure 11:
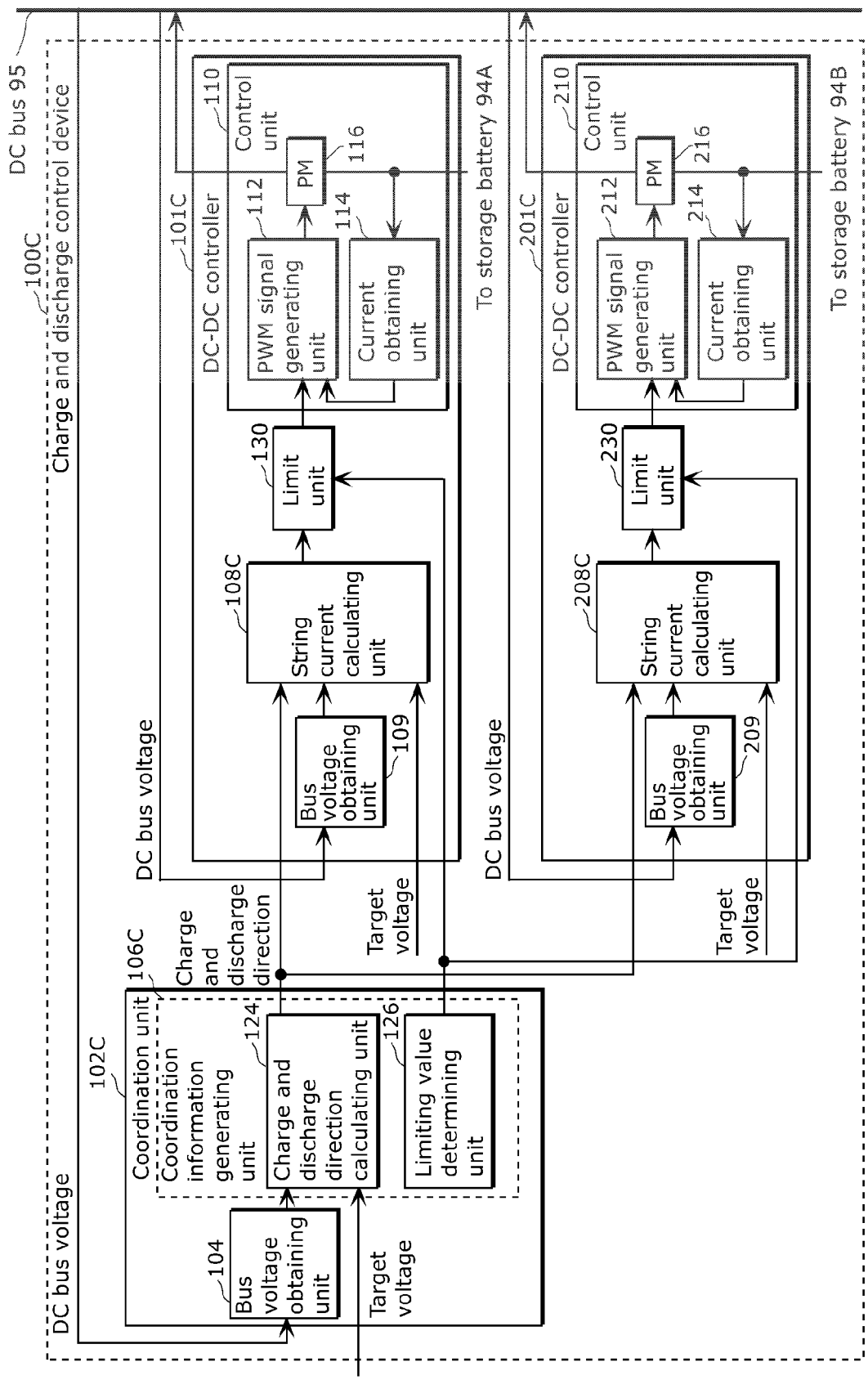
FIG. 11 is a diagram showing functional blocks of a charge and discharge control device according to a modification of Embodiment 2.

FIG. 11 shows functional blocks of a charge and discharge control device 100C according to the modification of Embodiment 2.

As shown in FIG. 11, the charge and discharge control device 100C includes a coordination unit 102C, a DC-DC converter 101C, and a DC-DC converter 201C.

A coordination information generating unit 106C included in the coordination unit 102C further includes a limiting value determining unit 126 in addition to the charge and discharge direction calculating unit 124.

The limiting value determining unit 126 determines a limiting value indicating a range of a current value which each storage battery is caused to output. Specifically, the limiting value determining unit 126 determines a range of the limiting value to prevent, when each storage battery is caused to output a current value in the range of the limiting value corresponding to the storage battery, the storage battery from being in at least one of an excess charging state and an excess discharging state.

In comparison with the DC-DC converters 101B and 201B, each of the DC-DC converters 101C and 201C further includes a corresponding one of limit units 130 and 230. As shown in FIG. 11, each of the limit units 130 and 230 is connected to a subsequent stage of a corresponding one of string current calculating units 108C and 208C. It is to be noted that the string current calculating units 108C and 208C each obtain a bus voltage from an external bus voltage obtaining unit in this modification. However, like the string current calculating units 108B and 208B shown in FIG. 9, the string current calculating units 108C and 208C may each include the bus voltage obtaining unit within.

When the current target value calculated by a corresponding one of the string current calculating units is not in the range indicated by the limiting value determined by the limiting value determining unit 126, each of the limit units 130 and 230 adjusts a current target value to allow the current target value to be in the range. At this time, for instance, information such as an SOC of a storage battery may be referred to. For example, when the SOC of the storage battery is obtained, and it is expected that causing the storage battery to output the current target value leads to significantly promote deterioration of the storage battery such as excess charging and excess discharging, it is conceivable that an absolute value of the current target value is adjusted to be smaller. Moreover, the limiting value determining unit 126 may determine, by referring to an SOH of a storage battery, a limiting value for each storage battery to allow the upper limit and the lower limit of the limiting value to be smaller for a storage battery having a lower SOH.

Figure 12:
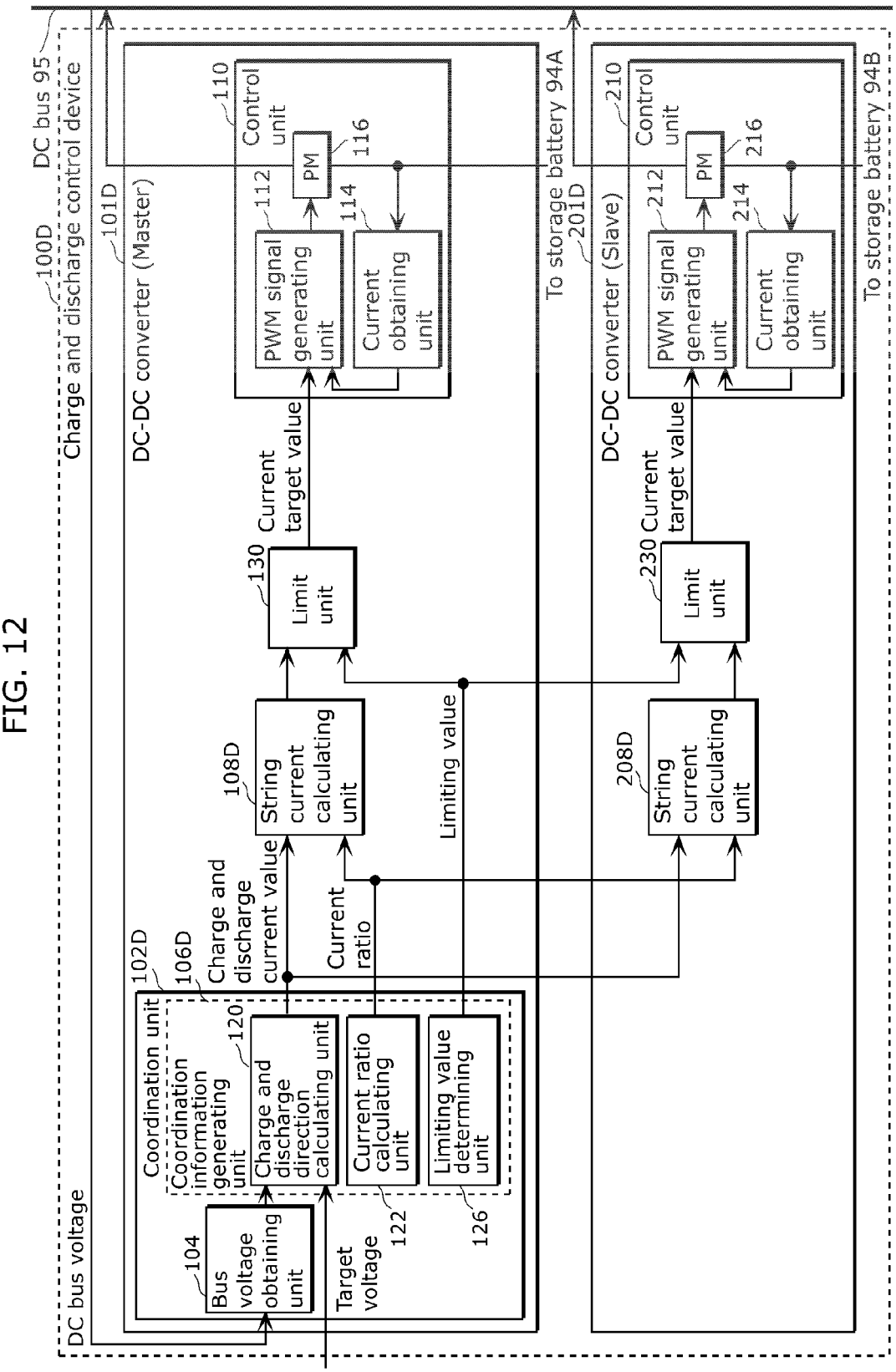
FIG. 12 is a diagram showing functional blocks of a charge and discharge control device according to a modification of Embodiment 1.

Next, FIG. 12 shows functional blocks of a charge and discharge control device 100D according to the modification of Embodiment 1. It is to be noted that the same structural elements as those shown in FIG. 11 are represented by the same reference signs, and a detailed description of the structural elements is omitted.

As shown in FIG. 12, the charge and discharge control device 100D includes a DC-DC converter 101D and a DC-DC converter 201D.

The DC-DC converter 101D includes a coordination unit 102D, a string current calculating unit 108D, a limit unit 130, and the control unit 110. In contrast, the DC-DC converter 201D includes a string current calculating unit 208D, a limit unit 230, and the control unit 210. It is to be noted that each of the string current calculating units 108D and 208D is the same structural element as a corresponding one of the string current calculating units 108A and 208A shown in FIG. 7.

In comparison with the coordination unit 102A included in the charge and discharge control device 100A shown in FIG. 7, the coordination unit 102D further includes the limiting value determining unit 126. The charge and discharge current calculating unit 120, the current ratio calculating unit 122, and the limiting value determining unit 126 constitute a coordination information generating unit 106D.

Each of the string current calculating units 108D and 208D calculates a current target value based on a charge and discharge current value and a current ratio obtained from the coordination unit 102D. The limit units 130 and 230 obtain the calculated current target values.

When the current target value is not in the range of the limiting value obtained from the limiting value determining unit 126, each of the limit units 130 and 230 adjusts the current target value to allow the current target value to be in the range of the limiting value.

Figure 13A:
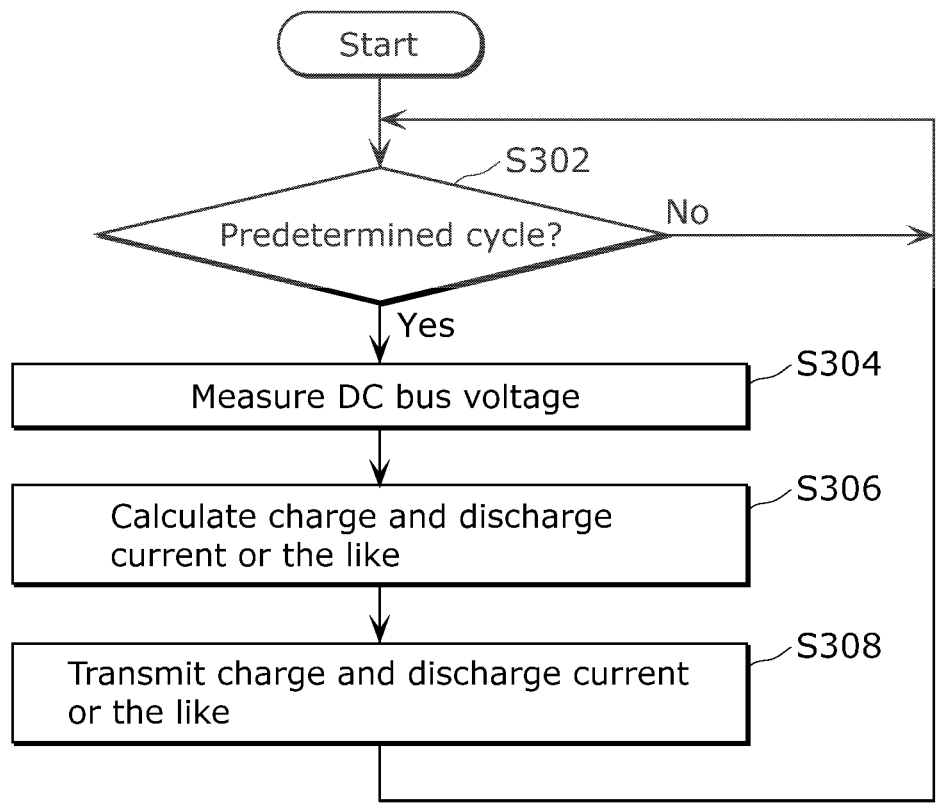
FIG. 13A is a flow chart showing a flow of processing performed by a coordination unit according to the modification of Embodiment 1.
Figure 13B:
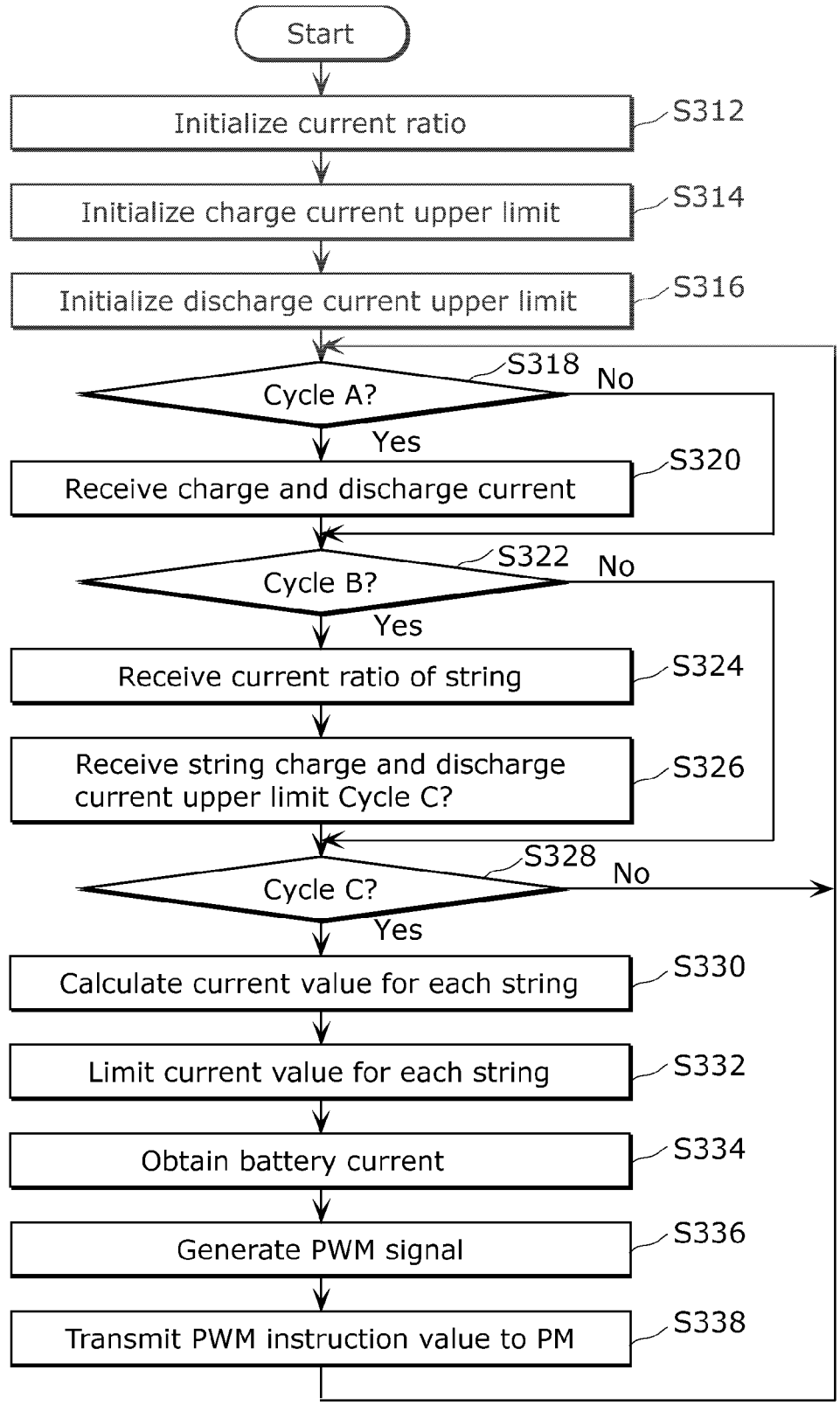
FIG. 13B is a flow chart showing a flow of processing performed by a DC-DC converter according to the modification of Embodiment 1.

FIG. 13A is a flow chart showing a flow of processing performed by the coordination unit 102D according to the modification of Embodiment 1. Moreover, FIG. 13B is a flow chart showing a flow of processing performed by the DC-DC converters 101D and 201D according to the modification of Embodiment 1.

In reference to FIG. 13A, first, the bus voltage obtaining unit 104 obtains a bus voltage of the DC bus 95 (S304) for every predetermined cycle (S302).

Next, the charge and discharge current calculating unit 120 calculates a value of charge and discharge current which all of storage batteries (i.e., all of strings) are caused to output to maintain the bus voltage of the DC bus 95 at a target voltage value. Moreover, the current ratio calculating unit 122 calculates a ratio of a current value which each storage battery is caused to output. Furthermore, the limiting value determining unit 126 determines a limiting value (S306).

Next, the coordination unit 102D transmits the charge and discharge current value and the current ratio to each of the string current calculating units 108D and 208D. Moreover, the coordination unit 102D transmits the limiting value to each of the limit units 130 and 230 (S308).

Subsequently, the coordination unit 102D repeats the processes from step S302 to step S308 until the charge and discharge control device 100D stops operating.

Next, in reference to FIG. 13B, each of the DC-DC converters 101D and 201D causes a corresponding one of the string current calculating units 108D and 208D to use a predetermined initial value as a current ratio (S312). Likewise, each of the DC-DC converters 101D and 201D causes a corresponding one of the string current calculating units 108D and 208D to use the predetermined initial value as the upper limit of a limiting value. Setting the upper limit for a current value in a charge direction of a storage battery (S314) and setting the upper limit for a current value in a discharge direction of the storage battery (S316) may be performed separately.

Next, the string current calculating units 108D and 208D each obtain a value of charge and discharge current from the coordination unit 102D (S320) for every predetermined cycle A (S318).

Moreover, the string current calculating units 108D and 208D each obtain a current ratio for a corresponding one of strings from the coordination unit 102D (S324) for every predetermined cycle B (S322). Furthermore, the string current calculating units 108D and 208D each obtain a limiting value for the corresponding one of the strings from the coordination unit 102D (S326).

Subsequently, the string current calculating units 108D and 208D each calculate, for the corresponding one of the strings, a target current value which the storage battery is caused to output (S330), for every predetermined cycle C (S328). Furthermore, the string current calculating units 108D and 208D each limit, for the corresponding one of the strings, the calculated target current value with the limiting value (S332).

Then, each of the control units 110 and 210 which has obtained the limited target current value obtains a current value of the battery (S334), generates a PWM signal (PWM instruction value) for driving a PM (S336), and transmits the generated PWM signal to a corresponding PM (S338).

Subsequently, the processes from step S318 to step S338 are repeated until the charge and discharge control device 100D stops operating.

It is to be noted that the master and the slave of the DC-DC converters may be interchanged in Embodiments 1 and 2 and their modifications. For instance, in reference to FIG. 3, the DC-DC converter 101 and the DC-DC converter 201 may be the slave and the master, respectively.

It is to be noted that Embodiments 1 and 2 and their modifications each have described the charge and discharge control device as a device that controls a current value output by a storage battery. However, the charge and discharge control device may control a power value output by the storage battery. In other words, the charge and discharge control device according to each of Embodiments 1 and 2 and their modifications may control an output value that indicates magnitude of current or power output by each of storage batteries connected in parallel to a DC bus, to maintain a bus voltage value, a voltage value of the DC bus, at a predetermined target voltage value.

In this case, the following reading is appropriately performed in the Description and the Drawings. The term "current value" can be read as the term "output value that indicates magnitude of current or power." Moreover, the term "current" can be read as the term "output that is current or power." Furthermore, the term "current target value" can be read as the term "output target value." Moreover, the term "charge and discharge current value" can be read as the term "charge and discharge output value." Furthermore, the term "string current calculating unit" can be read as the term "string output calculating unit." Moreover, the term "charge and discharge current calculating unit" can be read as the term "charge and discharge output calculating unit." Furthermore, the term "current ratio" can be read as the term "output ratio." Furthermore, the term "current ratio calculating unit" can be read as the term "output ratio calculating unit."

Figure 14:
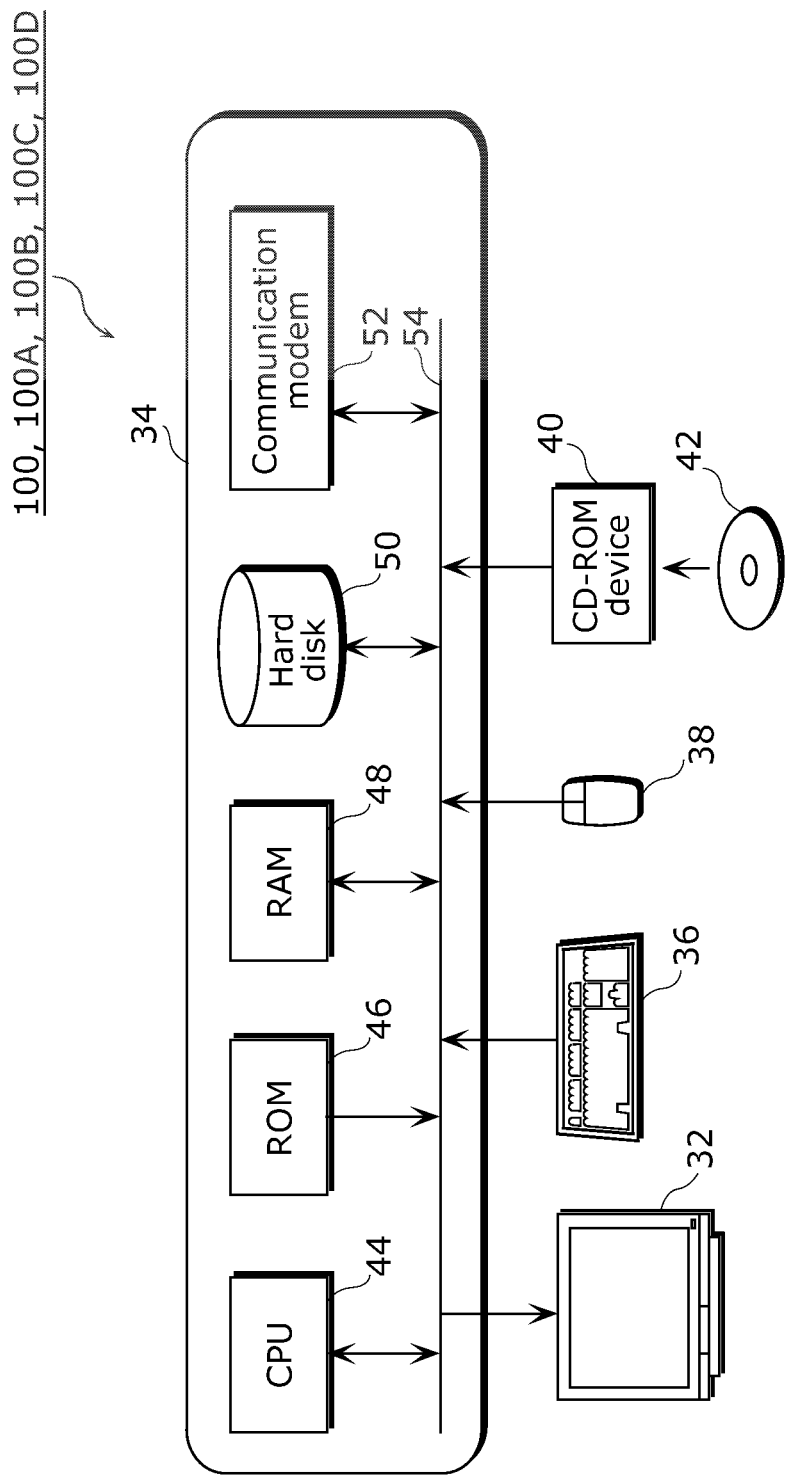
FIG. 14 is a block diagram showing a hardware configuration of a computer system that implements the charge and discharge control device according to Embodiments 1 and 2 and their modifications of the present invention.

It is to be noted that the charge and discharge control device described in each of Embodiments 1 and 2 and their modifications can be also realized by a computer. FIG. 14 is a block diagram showing a hardware configuration of a computer system that realizes the charge and discharge control devices 100, 100A, 100B, 100C, and 100D.

A charge and discharge control device includes: a computer 34; a keyboard 36 and a mouse 38 for giving instruction to the computer 34; a display 32 for presenting information such as operation results of the computer 34; a CD-ROM (Compact Disc-Read Only Memory) device 40 for reading a program executed by the computer 34; and a communication modem 52.

A program that is processing performed by the charge and discharge control device is (i) stored in a CD-ROM 42 which is a medium readable by the computer 34 and (ii) read by the CD-ROM device 40. Alternatively, the program is read by the communication modem 52 through a computer network.

The computer 34 includes a CPU (Central Processing Unit) 44, a ROM (Read Only Memory) 46, a RAM (Random Access Memory) 48, a hard disk 50, the communication modem 52, and a bus 54.

The CPU 44 executes the program read by the CD-ROM device 40 or the communication modem 52. The ROM 46 stores programs or data necessary for operations of the computer 34. The RAM 48 stores data such as parameters when a program is executed. The hard disk 50 stores programs, data, or the like. The communication modem 52 communicates with other computers through the computer network. The bus 54 mutually connects the CPU 44, the ROM 46, the RAM 48, the hard disk 50, the communication modem 52, the display 32, the keyboard 36, the mouse 38, and the CD-ROM device 40.

Moreover, part or all of the structural elements included in each of the devices may be realized as a single system Large Scale Integration (LSI). The system LSI is a super multifunctional LSI manufactured by integrating a plurality of components onto a single chip. Specifically, the system LSI is a computer system including a microprocessor, a ROM, a ROM, and so on. A computer program is stored in the ROM. The microprocessor carries out an operation according to the computer program, so that the system LSI carries out its function.

Furthermore, part or all of the structural elements included in each of the devices may be implemented as an IC card or a stand alone module that can be inserted into and removed from each device. The IC card or the module is a computer system including a microprocessor, a ROM, a RAM, and so on. The IC card or the module may include the aforementioned super multifunctional LSI. The microprocessor operates according to a computer program, so that the IC card or the module carries out its function. The IC card or the module may be tamper resistant.

Moreover, the present invention may be realized by any of the above-described methods. In addition, the present invention may be realized by a computer program which causes a computer to execute these methods.

In other words, the computer program causes the computer to execute a charge and discharge control method for controlling a current value which each of storage batteries connected in parallel to a DC bus outputs when charging or discharging, to maintain a bus voltage value that is a voltage value of the DC bus at a predetermined target voltage value, the method including: generating coordination information that is information for calculating the current value which each storage battery is caused to output, based on the bus voltage value and the target voltage value; calculating, based on the coordination information, a current target value indicating the current value which the storage battery is caused to output; and causing, among the storage batteries, a storage battery corresponding to the calculated current target value to output current having magnitude indicated by the calculated current target value, wherein in generating, the coordination information is generated to avoid simultaneous presence of, among the storage batteries, a storage battery that outputs current in a charge direction and a storage battery that outputs current in a discharge direction.

Furthermore, the present invention may be realized by a computer-readable recording medium such as a flexible disk, a hard disk, a CD-ROM, an MO, a DVD, a DVD-ROM, a DVD-RAM, a Blu-ray Disc (BD), a USB memory, a memory card such as an SD card, and a semiconductor memory on which the computer program or digital signal described above is recorded. Also, the present invention may be realized by the digital signal recorded on these recording media.

Moreover, the present invention may be realized by a computer program or a digital signal transmitted via an electric telecommunication line, a wireless or wired communication line, a network represented by the Internet, data broadcasting, and so on.

Furthermore, the present invention may be a computer system including a microprocessor and a memory. The memory may store a computer program, and the microprocessor may operate according to the computer program.

Moreover, by transferring the recording medium having the program or the digital signal recorded thereon or by transferring the program or the digital signal via the network or the like, the present invention may be implemented by a different independent computer system.

Furthermore, the above-described embodiments and modifications may be combined with each other.

The disclosed embodiments are exemplary in all respects and should be considered as non-limiting. The scope of the present invention is indicated not by the above description but by the Claims, and is intended to include all modifications within meaning and a range equivalent to those of the Claims.

INDUSTRIAL APPLICABILITY

The present invention can be applied to charge and discharge control devices or the like. In particular, the present invention can be applied to a charge and discharge control device that controls an output of each of storage battery which are connected in parallel to a DC bus, to maintain a bus voltage value, a voltage value of the DC bus, at a predetermined target voltage value.

REFERENCE SIGNS LIST

32 Display
34 Computer
36 Keyboard
38 Mouse
40 CD-ROM device
42 CD-ROM
44 CPU
46 ROM
48 RAM
50 Hard disk
52 Communication modem
54 Bus
80 Grid
82 Load
84 Inverter
86, 101, 101A, 101B, 101C, 101D, 201, 201A, 201B, 201C, 201D DC-DC converter
88 PV system
90 Storage battery system
92A, 92B String
94A, 94B Storage battery
95 DC bus
100, 100A, 100B, 100C, 100D Charge and discharge control device
102, 102A, 102B, 102C, 102D Coordination unit
104, 109, 209 Bus voltage obtaining unit
106, 106A, 106B, 106C, 106D Coordination information generating unit
108, 108A, 108B, 108C, 108D, 208, 208A, 208B, 208C, 208D String current calculating unit (string output calculating unit)
110, 210 Control unit
112, 212 PWM signal generating unit
114, 214 Current obtaining unit
116, 216 PM
120 Charge and discharge current calculating unit (charge and discharge output calculating unit)
122 Current ratio calculating unit (output ratio calculating unit)
124 Charge and discharge direction calculating unit
126 Limiting value determining unit
130, 230 Limit unit

The invention claimed is:

1. A storage battery system comprising:
a plurality of storage battery units connected in parallel and connected to a DC bus, which is connected to an inverter; and
a coordination control unit configured to generate coordination information for determining an output target value of current or power with which each storage battery unit outputs in a charge direction or a discharge direction in order to approximate a bus voltage value to a predetermined target voltage value, and transmit the coordination information generated to the storage battery units, the bus voltage value being a voltage value of the DC bus,
wherein said each storage battery unit includes:
at least one storage battery; and
a DC-DC converter, which is provided between the at least one storage battery and the DC bus, and which controls charging and discharging of the at least one storage battery based on the coordination information,
the DC-DC converter includes:
an output determining unit configured to determine, based on the coordination information transmitted by the coordination control unit, the output target value corresponding to current or power for which the at least one storage battery connected to the DC-DC converter is caused to output; and
a control unit configured to cause the at least one storage battery to output the current or the power corresponding to the output target value, and
the coordination control unit is configured to cause directions of current or power output in order to approximate the bus voltage value to the target voltage value to be in an identical direction in all the storage battery units, by transmitting the coordination information to the storage battery units, the identical direction being either in the charge direction or in the discharge direction.

2. The storage battery system according to claim 1,
wherein the coordination control unit includes:
a bus voltage obtaining unit configured to obtain the bus voltage value;
a charge and discharge output calculating unit configured to calculate, based on a difference between the target voltage value and the bus voltage value, a charge and discharge output value which indicates a total current or a total power with which the storage battery units output in order to approximate the bus voltage value to the target voltage value; and
an output ratio calculating unit configured to calculate an output ratio which indicates a ratio between the current or the power with which each storage battery unit outputs when the storage battery units output the total current or the total power indicated by the calculated charge and discharge output value,
the output ratio calculating unit is configured to calculate the output ratio to cause the directions of the current or the power which the storage battery units output to be identical with each other, and
the coordination control unit is configured to generate the charge and discharge output value and the output ratio as the coordination information.

3. The storage battery system according to claim 2,
wherein the output ratio calculating unit is configured to calculate the output ratio based on information indicating at least one of a condition and a charge level of each storage battery unit.

4. The storage battery system according to claim 1,
wherein the coordination control unit includes:
a first bus voltage obtaining unit configured to obtain a first bus voltage value; and
a charge and discharge direction calculating unit configured to calculate, based on a difference between the target voltage value and the first bus voltage value, a common charge and discharge direction of current or power with which the storage battery units output in order to approximate the first bus voltage value to the target voltage value, the DC-DC converter further includes a second bus voltage obtaining unit configured to obtain a second bus voltage value, the coordination control unit is configured to transmit the charge and discharge direction as the coordination information to the storage battery units, and the output determining unit is configured to calculate the output target value based on the charge and discharge direction and a difference between the second bus voltage value and the target voltage value.

5. The storage battery system according to claim 4, wherein the output determining unit is configured to:

calculate the output target value that is less than or equal to a predetermined value when a direction of current or power with which a storage battery unit including the output determining unit outputs in order to offset the difference between the second bus voltage value and the target voltage value is different from the charge and discharge direction indicated by the coordination information; and determine the output target value to cause current or power having a greater absolute value when the difference between the second bus voltage value and the target voltage value is greater, to be output in the charge and discharge direction indicated by the coordination information, when the direction of the current or the power which the storage battery unit including the output determining unit outputs in order to offset the difference is identical with the charge and discharge direction.

6. The storage battery system according to claim 1, wherein the coordination control unit includes a limit range determining unit configured to determine, for each of the storage battery units, a limit range for the current or the power with which each storage battery unit outputs, and the storage battery system further comprises a limit unit configured to adjust the output target value, which is determined by the output determining unit, to be in the limit range when the output target value is not in the limit range.

7. The storage battery system according to claim 6, wherein the limit range determining unit is configured to determine, for each of the storage battery units, the limit range to prevent each storage battery unit from being in at least one of an excess discharging state and an excess charging state.

8. The storage battery system according to claim 1, wherein the coordination control unit is configured to distribute power to be output by the inverter among the storage battery units in a limit range determined for each of the storage battery units, by transmitting the coordination information to the storage battery units.

9. A charge and discharge control method comprising:

generating coordination information for determining an output target value for current or power with which each storage battery unit of a plurality of storage battery units connected in parallel and connected to a DC bus, which is connected to an inverter, outputs in a charge direction or a discharge direction in order to approximate a bus voltage value to a predetermined target voltage value, and transmitting the coordination information generated to the storage battery units, the bus voltage value being a voltage value of the DC bus; and controlling, in each storage battery unit, charging and discharging of at least one storage battery included in a corresponding storage battery unit, based on the coordination information, wherein in the controlling, the output target value corresponding to current or power with which the at least one storage battery is caused to output is determined based on the coordination information, and the at least one storage battery is caused to output the current or the power corresponding to the output target value, and in the generating, directions of current or power, which are outputted in order to approximate the bus voltage value to the target voltage value, are caused to be in an identical direction in all the storage battery units, by transmitting the coordination information to the storage battery units, the identical direction being either in the charge direction or in the discharge direction.

10. A charge and discharge control device comprising:

a coordination control unit configured to generate coordination information for determining an output target value for current or power with which each storage battery unit of a plurality of storage battery units connected in parallel and connected to a DC bus, which is connected to an inverter, outputs in a charge direction or a discharge direction in order to approximate a bus voltage value to a predetermined target voltage value, and transmit the coordination information generated to the storage battery units, the bus voltage value being a voltage value of the DC bus; and a plurality of DC-DC converters included in a plurality of storage battery units, wherein each DC-DC converter is provided between the DC bus and at least one storage battery included in a corresponding one of the storage battery units, and controls charging and discharging of the at least one storage battery based on the coordination information, each DC-DC converter includes:

an output determining unit configured to determine, based on the coordination information transmitted by the coordination control unit, the output target value corresponding to current or power with which the at least one storage battery is caused to output; and a control unit configured to cause the at least one storage battery to output the current or the power corresponding to the output target value, and the coordination control unit is configured to cause directions of current or power output in order to approximate the bus voltage value to the target voltage value to be in an identical direction in all the storage battery units, by transmitting the coordination information to the storage battery units, the identical direction being either in the charge direction or in the discharge direction.

* * * * *